(12) United States Patent
Berg et al.

(10) Patent No.: US 10,431,026 B2
(45) Date of Patent: Oct. 1, 2019

(54) USING WEARABLE TO DETERMINE INGRESS OR EGRESS

(71) Applicant: ASSA ABLOY AB, Stockholm (SE)

(72) Inventors: Daniel Berg, Sundbyberg (SE); Fredrik Einberg, Huddinge (SE)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/569,218

(22) PCT Filed: May 2, 2016

(86) PCT No.: PCT/EP2016/059748
§ 371 (c)(1),
(2) Date: Oct. 25, 2017

(87) PCT Pub. No.: WO2016/177668
PCT Pub. Date: Nov. 10, 2016

(65) Prior Publication Data
US 2018/0357845 A1    Dec. 13, 2018

Related U.S. Application Data

(60) Provisional application No. 62/156,035, filed on May 1, 2015, provisional application No. 62/156,030, filed
(Continued)

(51) Int. Cl.
*G07C 9/00* (2006.01)
*H04L 29/06* (2006.01)
(Continued)

(52) U.S. Cl.
CPC ......... *G07C 9/00309* (2013.01); *G06F 1/163* (2013.01); *G07C 9/00087* (2013.01);
(Continued)

(58) Field of Classification Search
CPC ............ G07C 9/00309; G07C 9/00111; G07C 2009/00769; G07C 2209/63;
(Continued)

(56) References Cited

U.S. PATENT DOCUMENTS 6,374,356 B1    4/2002    Daigneault et al.
6,719,200 B1    4/2004    Wiebe
(Continued)

FOREIGN PATENT DOCUMENTS

EP    1710974    10/2005
EP    1760671    3/2007
(Continued)

OTHER PUBLICATIONS

Official Action for U.S. Appl. No. 15/559,887, dated Jun. 28, 2018 12 pages.
(Continued)

*Primary Examiner* — Yong Hang Jiang
(74) *Attorney, Agent, or Firm* — Sheridan Ross P.C.

(57) ABSTRACT

An access control system comprising a reader configured to make an ingress or egress determination using information received from one or more mobile devices is described. The reader may be further configured to store information about ingress and egress events for analysis by a system administrator.

20 Claims, 17 Drawing Sheets

Related U.S. Application Data on May 1, 2015, provisional application No. 62/161,640, filed on May 14, 2015, provisional application No. 62/162,273, filed on May 15, 2015, provisional application No. 62/164,099, filed on May 20, 2015, provisional application No. 62/167,172, filed on May 27, 2015, provisional application No. 62/167,136, filed on May 27, 2015, provisional application No. 62/197,945, filed on Jul. 28, 2015, provisional application No. 62/197,985, filed on Jul. 28, 2015, provisional application No. 62/198,240, filed on Jul. 29, 2015.

(51) Int. Cl.
| | | |
|---|---|---|
| *H04W 12/08* | (2009.01) | |
| *H04L 9/32* | (2006.01) | |
| *H04W 12/06* | (2009.01) | |
| *G08B 7/06* | (2006.01) | |
| *G08B 25/01* | (2006.01) | |
| *H04W 12/04* | (2009.01) | |
| *G06F 1/16* | (2006.01) | |
| *H04B 1/3827* | (2015.01) | |
| *G06F 21/34* | (2013.01) | |
| *H04W 4/80* | (2018.01) | |
| *G06K 9/00* | (2006.01) | |
| *H04W 88/02* | (2009.01) | |
| *H04W 12/00* | (2009.01) | |

(52) U.S. Cl.
CPC ...... *G07C 9/00111* (2013.01); *G07C 9/00174* (2013.01); *G07C 9/00571* (2013.01); *G08B 7/066* (2013.01); *G08B 25/016* (2013.01); *H04B 1/385* (2013.01); *H04L 9/3226* (2013.01); *H04L 63/0428* (2013.01); *H04L 63/062* (2013.01); *H04L 63/083* (2013.01); *H04L 63/0853* (2013.01); *H04L 63/0861* (2013.01); *H04L 63/0876* (2013.01); *H04L 63/108* (2013.01); *H04W 12/04* (2013.01); *H04W 12/06* (2013.01); *H04W 12/08* (2013.01); *G06F 21/34* (2013.01); *G06K 9/00885* (2013.01); *G07C 9/00563* (2013.01); *G07C 2009/00769* (2013.01); *H04L 2463/121* (2013.01); *H04W 4/80* (2018.02); *H04W 12/00503* (2019.01); *H04W 12/00508* (2019.01); *H04W 88/02* (2013.01)

(58) Field of Classification Search
CPC ............ G07C 9/00571; G07C 9/00103; G07C 9/00896; G07C 2009/00555; G07C 2009/00793; G07C 9/00174; G07C 9/00817; G07C 2009/00388; G07C 2009/00412; G07C 2009/00634; G07C 2209/08; G07C 9/00087; G07C 9/00563; G07C 2009/00373; G07C 2009/00507
USPC ....................................................... 340/5.61
See application file for complete search history.

(56) References Cited

U.S. PATENT DOCUMENTS

| | | | |
|---|---|---|---|
| 6,766,450 B2 | 7/2004 | Micali | |
| 7,548,151 B2 | 6/2009 | Roosli et al. | |
| 7,706,778 B2* | 4/2010 | Lowe | H04L 63/062 |
| | | | 455/411 |
| 8,074,271 B2 | 12/2011 | Davis et al. | |
| 9,007,173 B2* | 4/2015 | McIntyre | G07C 9/00309 |
| | | | 340/5.61 |
| 9,196,104 B2 | 11/2015 | Dumas et al. | |
| 9,336,637 B2 | 5/2016 | Neil et al. | |
| 9,344,436 B1* | 5/2016 | Sheng | H04W 4/021 |
| 9,672,727 B1 | 6/2017 | Alexander et al. | |
| 9,761,072 B2 | 9/2017 | Arfwedson et al. | |
| 9,942,222 B1 | 4/2018 | Fenton et al. | |
| 2002/0178385 A1* | 11/2002 | Dent | G07C 9/00309 |
| | | | 726/27 |
| 2004/0068935 A1 | 4/2004 | Ichikawa et al. | |
| 2005/0151640 A1 | 7/2005 | Hastings | |
| 2006/0164208 A1 | 7/2006 | Schaffzin et al. | |
| 2007/0024417 A1 | 2/2007 | Gerstenkorn | |
| 2008/0284564 A1 | 11/2008 | Leitch | |
| 2010/0201482 A1 | 8/2010 | Robertson et al. | |
| 2010/0274100 A1 | 10/2010 | Behar et al. | |
| 2012/0112901 A1 | 5/2012 | Chasko | |
| 2012/0234058 A1 | 9/2012 | Neil et al. | |
| 2012/0311675 A1 | 12/2012 | Ham et al. | |
| 2013/0015947 A1 | 1/2013 | Best | |
| 2013/0044055 A1* | 2/2013 | Karmarkar | G06F 3/013 |
| | | | 345/158 |
| 2013/0060577 A1* | 3/2013 | DeBusk | G06Q 30/00 |
| | | | 705/3 |
| 2013/0086375 A1 | 4/2013 | Lyne et al. | |
| 2013/0095802 A1 | 4/2013 | Wang | |
| 2013/0124855 A1 | 5/2013 | Varadarajan et al. | |
| 2013/0241694 A1 | 9/2013 | Sharma et al. | |
| 2013/0324081 A1 | 12/2013 | Gargi et al. | |
| 2014/0091903 A1 | 4/2014 | Birkel et al. | |
| 2014/0120905 A1 | 5/2014 | Kim | |
| 2014/0225713 A1 | 8/2014 | McIntyre et al. | |
| 2014/0282877 A1* | 9/2014 | Mahaffey | H04L 63/0853 |
| | | | 726/3 |
| 2014/0282927 A1 | 9/2014 | McLaughlin et al. | |
| 2014/0359722 A1 | 12/2014 | Shultz et al. | |
| 2014/0373111 A1 | 12/2014 | Moss et al. | |
| 2015/0028996 A1* | 1/2015 | Agrafioti | G06F 21/40 |
| | | | 340/5.82 |
| 2015/0067803 A1 | 3/2015 | Alduaiji | |
| 2015/0070136 A1 | 3/2015 | Kameyama et al. | |
| 2015/0121465 A1 | 4/2015 | Berns et al. | |
| 2015/0161876 A1 | 6/2015 | Castillo | |
| 2015/0172897 A1 | 6/2015 | Mariathasan et al. | |
| 2015/0309767 A1* | 10/2015 | Osoinach | G06F 3/165 |
| | | | 340/4.42 |
| 2016/0036965 A1* | 2/2016 | Kim | H04W 4/70 |
| | | | 455/411 |
| 2016/0240023 A1 | 8/2016 | Toivonen et al. | |
| 2016/0274556 A1 | 9/2016 | Murphy | |
| 2018/0061156 A1 | 3/2018 | Einberg | |

FOREIGN PATENT DOCUMENTS

| | | |
|---|---|---|
| EP | 1895445 | 3/2008 |
| EP | 1926038 | 5/2008 |
| EP | 2434461 | 3/2012 |
| EP | 2469816 | 6/2012 |
| EP | 2493232 | 8/2012 |
| EP | 2620919 | 7/2013 |
| EP | 2809046 | 12/2014 |
| GB | 2402840 | 12/2004 |
| WO | WO 2004/025545 | 3/2004 |
| WO | WO 2005/024549 | 3/2005 |
| WO | WO 2007/121414 | 10/2007 |
| WO | WO 2009/089208 | 7/2009 |
| WO | WO 2009/127984 | 10/2009 |
| WO | WO 2009/143415 | 11/2009 |
| WO | WO 2012/113080 | 8/2012 |
| WO | WO 2013/118454 | 8/2013 |
| WO | WO 2014/098755 | 6/2014 |
| WO | WO 2014/172325 | 10/2014 |
| WO | WO 2014/191537 | 12/2014 |
| WO | WO 2016/177666 | 11/2016 |
| WO | WO 2016/177669 | 11/2016 |
| WO | WO 2016/177671 | 11/2016 |
| WO | WO 2016/177672 | 11/2016 |
| WO | WO 2016/177673 | 11/2016 |
| WO | WO 2016/177674 | 11/2016 |

(56) References Cited

FOREIGN PATENT DOCUMENTS

| WO | WO 2016/178081 | 11/2016 |
|---|---|---|
| WO | WO 2016/178082 | 11/2016 |
| WO | WO 2016/178085 | 11/2016 |

OTHER PUBLICATIONS

Notice of Allowance for U.S. Appl. No. 15/559,887, dated Sep. 12, 2018 10 pages.
Official Action for U.S. Appl. No. 15/569,105, dated Jun. 25, 2018 19 pages.
International Preliminary Report on Patentability for International (PCT) Patent Application No. PCT/EP2016/059750, dated Nov. 16, 2017 8 pages.
International Search Report and Written Opinion prepared by the European Patent Office dated May 27, 2016, for International Application No. PCT/EP2016/056145.
Official Action for U.S. Appl. No. 15/559,887, dated Jan. 4, 2018 12 pages.
International Search Report for International Patent Application No. PCT/EP2016/059748, dated Jun. 24, 2016, 6 pages.
Written Opinion for International Patent Application No. PCT/EP2016/059748, dated Jun. 24, 2016, 7 pages.
International Search Report and Written Opinion for International (PCT) Patent Application No. PCT/EP2016/059746, dated Jul. 22, 2016 11 pages.
Second Written Opinion for International (PCT) Patent Application No. PCT/EP2016/059746, dated Mar. 31, 2017 6 pages.
International Preliminary Report on Patentability for International (PCT) Patent Application No. PCT/EP2016/059746, dated Jul. 26, 2017 17 pages.
International Search Report and Written Opinion for International (PCT) Patent Application No. PCT/IB2016/000654, dated Aug. 8, 2016 13 pages.
Second Written Opinion for International (PCT) Patent Application No. PCT/IB2016/000654, dated Jun. 7, 2017 8 pages.
International Preliminary Report on Patentability for International (PCT) Patent Application No. PCT/IB2016/000654, dated Sep. 4, 2017 22 pages.
Second Written Opinion for International (PCT) Patent Application No. PCT/EP2016/059748, dated Mar. 30, 2017 8 pages.
International Preliminary Report on Patentability for International (PCT) Patent Application No. PCT/EP2016/059748, dated Jun. 29, 2017 19 pages.
International Search Report and Written Opinion for International (PCT) Patent Application No. PCT/EP2016/059750, dated Aug. 2, 2016 12 pages.
International Search Report and Written Opinion for International (PCT) Patent Application No. PCT/IB2016/000653, dated Sep. 2, 2016 12 pages.
Second Written Opinion for International (PCT) Patent Application No. PCT/IB2016/000653, dated Apr. 28, 2017 6 pages.
International Preliminary Report on Patentability for International (PCT) Patent Application No. PCT/IB2016/000653, dated Jul. 27, 2017 7 pages.
International Search Report and Written Opinion for International (PCT) Patent Application No. PCT/EP2016/059753, dated Jun. 3, 2016 11 pages.
Second Written Opinion for International (PCT) Patent Application No. PCT/EP2016/059753, dated Mar. 31, 2017 6 pages.
International Preliminary Report on Patentability for International (PCT) Patent Application No. PCT/EP2016/059753, dated Jul. 3, 2017 18 pages.
International Search Report and Written Opinion for International (PCT) Patent Application No. PCT/EP2016/059752, dated Jul, 26, 2016 12 pages.
Second Written Opinion for International (PCT) Patent Application No. PCT/EP2016/059752, dated Mar. 29, 2017 6 pages.
International Preliminary Report on Patentability for International (PCT) Patent Application No. PCT/EP2016/059752, dated Jun. 28, 2017 17 pages.
International Search Report and Written Opinion for International (PCT) Patent Application No. PCT/EP2016/059754, dated Jun. 8, 2016 12 pages.
Second Written Opinion for International (PCT) Patent Application No. PCT/EP2016/059754, dated Mar. 21, 2017 5 pages.
International Preliminary Report on Patentability for International (PCT) Patent Application No. PCT/EP2016/059754, dated Jun. 19, 2017 19 pages.
International Search Report and Written Opinion for International (PCT) Patent Application No. PCT/EP2016/059756, dated Jun. 27, 2016 11 pages.
Second Written Opinion for International (PCT) Patent Application No. PCT/EP2016/059756, dated Mar. 31, 2017 6 pages.
International Preliminary Report on Patentability for International (PCT) Patent Application No. PCT/EP2016/059756, dated Jul. 3, 2017 17 pages.
International Search Report and Written Opinion for International (PCT) Patent Application No. PCT/IB2016/000669, dated Aug. 1, 2016 12 pages.
Second Written Opinion for International (PCT) Patent Application No. PCT/IB2016/000669, dated Apr. 6, 2017 6 pages.
Official Action for U.S. Appl. No. 15/569,105, dated Nov. 23, 2018 24 pages.
Official Action for U.S. Appl. No. 15/569,196, dated Mar. 22, 2019 17 pages.
Advisory Action for U.S. Appl. No. 15/569,105, dated Mar. 11, 2019 5 pages.

* cited by examiner

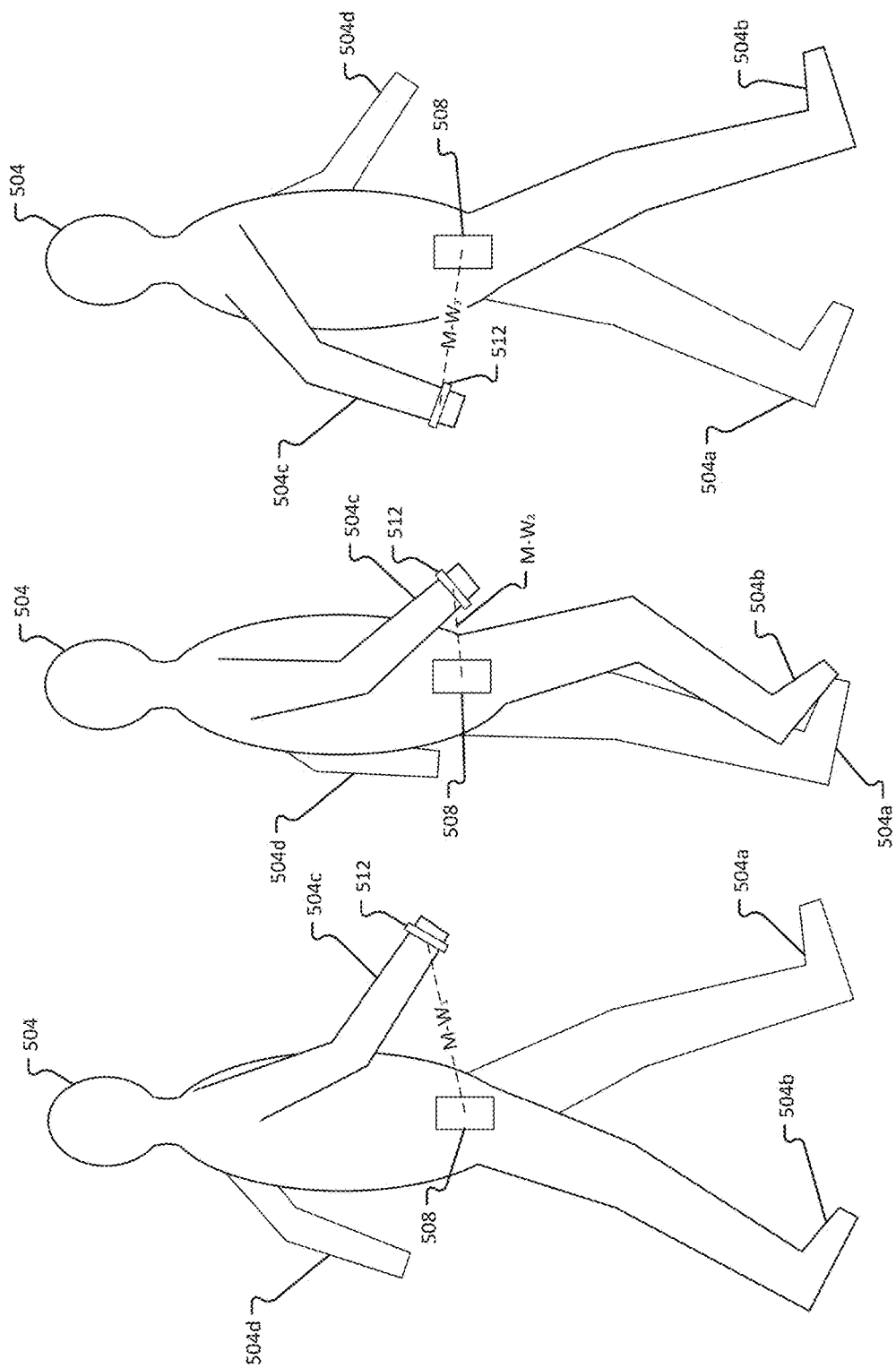

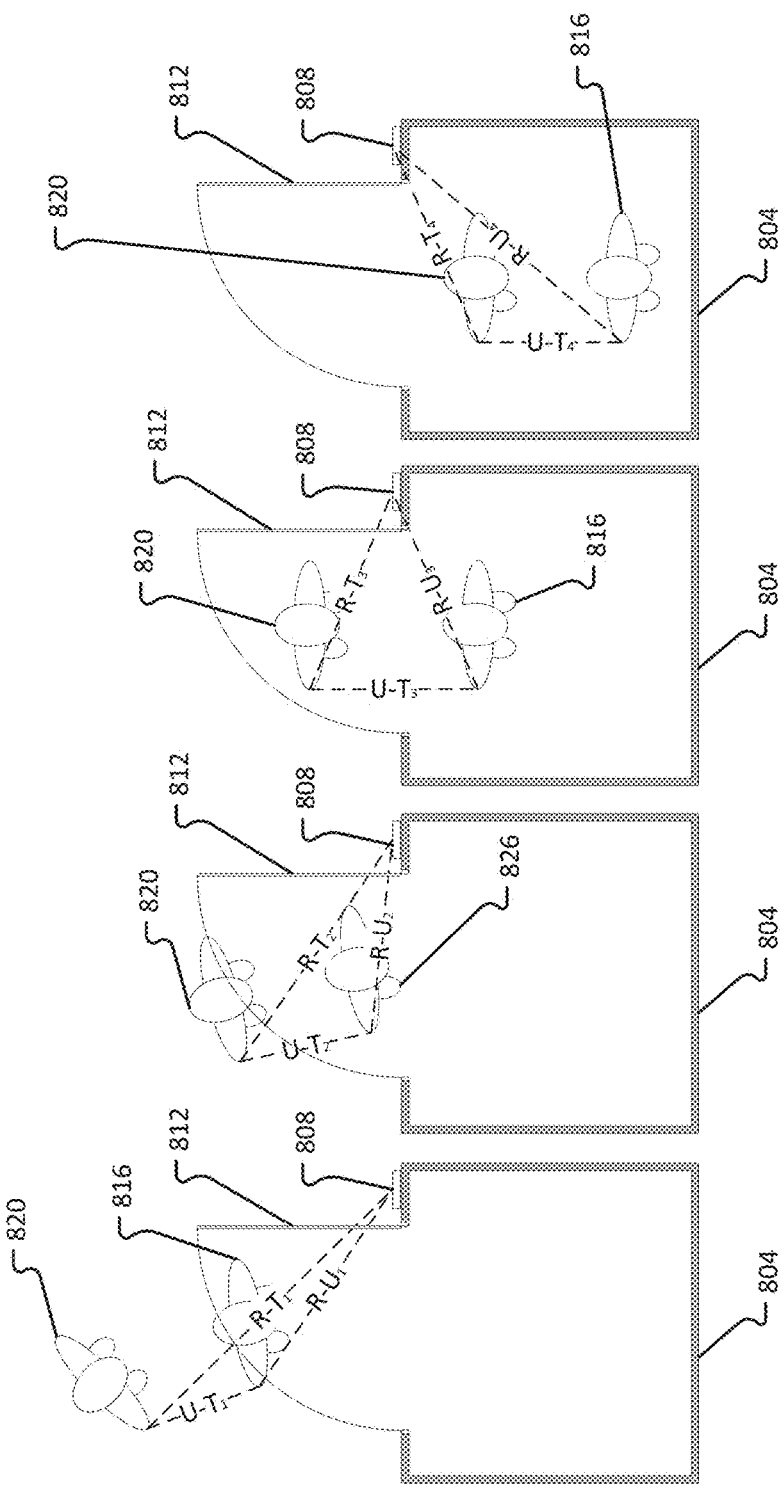

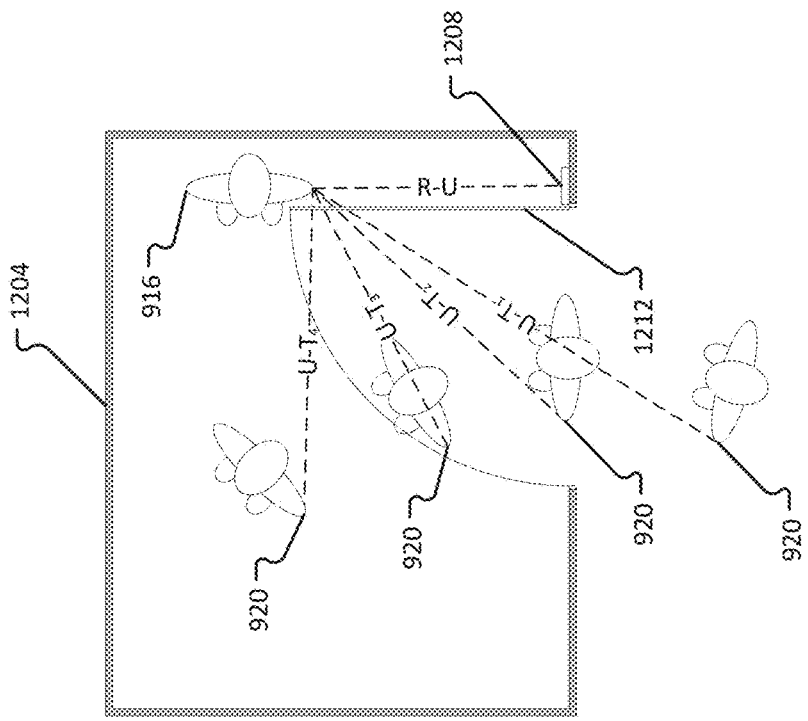
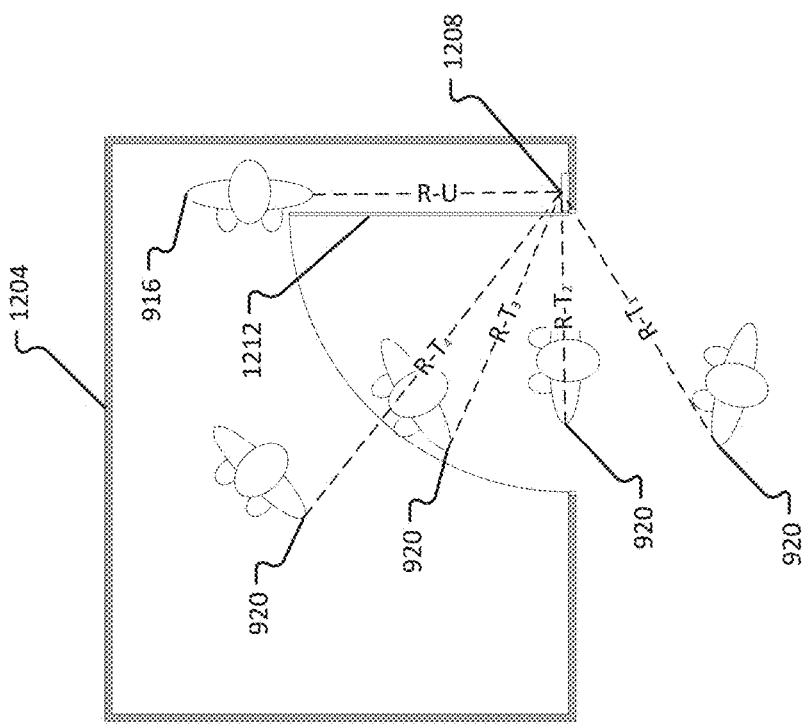

USING WEARABLE TO DETERMINE INGRESS OR EGRESS

CROSS REFERENCE TO RELATED APPLICATIONS

The present application is a national stage application under 35 U.S.C. 371 of PCT Patent Application. No. PCT/EP2016/059748, having an international filing date of May 2, 2016, which designated the U.S., which claimed the benefits of and priority, under 35 U.S.C. § 119(e), to U.S. Provisional Application Ser. No. 62/156,035, filed on May 1, 2015, entitled "Authentication Channel Flow through Wearable"; 62/156,030, filed on May 1, 2015, entitled "Using Multiple Mobile Devices to Determine Position, Location, or inside/Outside Door"; 62/161,640, filed on May 14, 2015, entitled "Using Wearable to Determine Ingress or Egress"; 62/162,273, filed on May 15, 2015, entitled "Continuous Authentication"; 62/164,099, filed on May 20, 2015, entitled "Using a Secondary Mobile Device to Identify a Trusted Environment"; 62/167,172, filed on May 27, 2015, entitled "Method and Apparatus for Making a Decision on a Card"; 62/167,136, filed on May 27, 2015, entitled "Split Provisioning of Personal Wearable and Enterprise Phones"; 62/197,945, filed on. Jul. 28, 2015, entitled "Wearable Discovery for Authentication"; 62/197,985, filed on Jul. 28, 2015, entitled "Wearable Misplacement"; and 62/198,240, filed on Jul. 29, 2015, entitled "Invisible Indication of Duress via Wearable." The entire disclosures of the applications listed above are hereby incorporated by reference, in their entirety, for all that they teach and for all purposes.

FIELD

The present disclosure is generally directed to access control systems and more specifically to devices that are configured to provide access information to access control systems.

BACKGROUND

In general, access control systems rely upon lock and key principles to grant or deny access to a secure asset. Whether the keys are configured as physical keys presented to a mechanical lock or virtual keys presented to an access control unit, most keys include specific features or characteristics that are either recognized by or match lock features before access is granted to the asset. Some access control systems employ the use of various portable devices to maintain credential information for presentation to a reading device. The portable devices are generally configured to communicate with the reading device via wireless communication protocols.

One example of a portable device includes the radio frequency identification (RFID) device, such as a contactless smart card, key fob, or the like, to store credential information that can be used to gain access to an asset. When presented to a reader/interrogator, the smart card transmits the stored credential information for verification by the reader/interrogator. The reader/interrogator processes the credential information and determines if the smart card being presented is a valid smart card. If the reader/interrogator determines that credential information associated with the smart card is valid, then the reader/interrogator initiates any number of actions including allowing the holder of the smart card access to an asset protected thereby.

Another example of a portable device can include a wireless mobile device, such as a communication device, mobile phone, smartphone, etc. In this case, credential information may be stored in a memory associated with the mobile device and communicated to a reading device using at least one wireless communication protocol available to the mobile phone.

As access control technology continually progresses, devices and communication protocols evolve to offer more security, portability, and interoperability. However, the benefits of this evolution may be thwarted by increasing instances of identity theft, stolen credentials, and/or other access control device theft.

SUMMARY

It is with respect to the above issues and other problems that the embodiments presented herein were contemplated.

Access control systems are well-suited for gathering useful information. For example, an access control system may be configured to count the number of times it grants access to the protected resource in a given period of time (hour, day, week, etc.), which information can then be used to identify needed access point maintenance intervals, or to schedule or allocate access-point resources (e.g. security guards, receptionists, and so forth). While some access control systems may be capable only of tracking generic information, others may be capable of tracking user-specific information, such as the time(s) at which each user presents credentials to the access control system reader. Such information can be used, for example, to verify an individual's claimed hours worked.

The proliferation of wearable mobile devices presents an opportunity to enhance access control system functionality. Such wearable mobile devices may be used in place of or in conjunction with more traditional mobile devices to gather and send information to an access control system, thus increasing the ability of the access control system to gather useful information.

An access control system is proposed herein that uses information gathered from one or more mobile devices to determine whether the user of the mobile device(s) is entering or exiting a protected resource. In some embodiments, at least one of the mobile devices is a wearable mobile device.

As used herein, an access control system is a system comprising a reader configured to control access to a protected resource at a given access point, such as a door or gate, and further comprising one or more credentials (e.g., an RFID tag, a mobile device, etc.) configured to communicate with the reader. A mobile device may be a smartphone, a tablet, or any other device comprising a processor, a data storage capability (e.g., computer memory), and a wireless communication capability. The terms identification code, electronic key, and mobile key are used interchangeably herein. A user is an individual in possession of a mobile device that has an authorized identification code and that is configured to wirelessly communicate with the reader of an access control system. A reader or reading device or interrogator is a device having a location (which may or may not be fixed) near an access point to a protected resource, and that is configured to grant access to the protected resource, for example, upon receipt of authorized credentials from a mobile device. A reader may comprise a contact-based or contactless communication interface (also referred to herein as a wireless communication interface, which may include one or both of a wireless communication receiver and a wireless communication transmitter, or a wireless communication transceiver), a memory for storing at least instructions, and a processor for carrying out instructions stored in memory. Alternatively or additionally, the instructions may be stored as firmware.

A wearable mobile device, also referred to simply as a wearable device, can include any physical electronic device having a processor, a memory, and a communications module that is configured to be worn by, or otherwise attached to, a user. A wearable mobile device is a type of mobile device, as the term mobile device is used herein. In some cases, the wearable device may be worn as an implant introduced intradermally (e.g., within the skin, etc.) and/or subdermally (e.g., under the skin, etc.) in a user. Additionally or alternatively, a wearable device may be adhered or otherwise placed into contact with the dermis of a user (e.g., supradermally or outside of the skin of a user, etc.). In some embodiments, a wearable device may be worn as an article of clothing or other accessory. Examples of wearable devices can include, but are in no way limited to, activity monitors, heart rate monitors, watches, rings, belts, bracelets, jewelry, clothing, buttons, necklaces, shoes, hats, pins, accessories, scarves, combinations and/or parts thereof, and/or any other wearable item.

By way of example, visitors to a secure facility, or location, may be issued a wearable device for authentication while visiting. For example, the wearable device may be attached to a user's clothing, body, or other item that is in proximity to the user. This attachment may include clasping, pinning, connecting, or otherwise fastening the wearable device to be worn by the user.

Any number of communications protocols may be employed by the wearable device and/or the mobile device. Examples of communications protocols can include, but are in no way limited to, the protocol or protocols associated with near field communication (NFC), radio frequency identification (RFID) (e.g., operating at 125 kHz, 13.56 kHz, etc.), Bluetooth® wireless communication, Bluetooth® Low Energy (BLE), Personal Area Network (PAN), Body Area Network (BAN), cellular communications, WiFi communications, and/or other wireless communications.

For instance, a user carrying a mobile device and wearing a wearable device while walking may impart a similar repetitive motion, force, or movement upon both the wearable device and the mobile device. Continuing this example, a user walking may provide a substantially similar force while stepping that is imparted to the wearable device and the mobile device. This force may occur with every step taken by the user (e.g., where a peak force occurs with every step that is taken at some point in time measured over a period of time, etc.). In other words, both the mobile device and the wearable device may experience a similar periodicity of maximum and minimum forces exerted on their respective sensors (e.g., gyroscopic sensors, accelerometers, etc.). Additionally or alternatively, when a wearable device is separated from the mobile device, or vice versa, the motion results from the comparison may be determined to be different. For example, a user may leave a mobile device on a desk while walking with the wearable device in an access controlled environment.

Similarly, other information from one or more components of the wearable device and mobile device may be gathered and used by an access control system. This information may include, but is in no way limited to, temperature data, barometric pressure data, biometric data (e.g., heart rate, breathing rate, etc.), altimeter and/or altitude data, audible data (e.g., detecting similar sounds in an area around each device and comparing the detected sounds and/or sound profiles to one another determine whether continuous authentication is allowed, where matching audible data allows authentication and where nonmatching audible data disables authentication, etc.), light data (e.g., detecting similar light radiation in an area around each device and comparing the light detected at each device to determine whether continuous authentication is allowed, etc.), magnetic radiation data, other energy data, combinations thereof, and/or the like.

As provided herein, the wearable device may be configured to operate in conjunction with one or more mobile devices. In some embodiments, the mobile devices may be provided by a manufacturer different from the wearable device and the two devices may utilize the same or different operating systems.

The wearable device may include its own power source or use power provided from another source. In some embodiments, the wearable device may include electronics that can be powered by a mobile device and/or a reading device. One example of such electronics may be a wearable device having RFID components, (e.g., a capacitor, antenna, etc.). In this example, when the wearable device is presented within an RFID field provided by the mobile device and/or the reading device, the mobile device and/or the reading device provides energy via the RFID field that can be stored in the capacitor of the wearable device.

The terms "memory," "computer memory," and "computer-readable medium," as used herein, refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credentials" or "credential information" refer to any data, set of data, encryption scheme, key, and/or transmission protocol used by a particular device (e.g., a "mobile device" or "wearable device") to authenticate and/or to verify its authenticity with a reader, mobile device, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 5A depicts a person with a mobile device and a wearable device walking at a first point in time;

FIG. 5B depicts the person of FIG. 5A walking at a second point in time;

FIG. 5C depicts the person of FIGS. 5A and 5B walking at a third point in time;

FIG. 8A depicts a user and a tailgater approaching a protected resource;

FIG. 8B depicts the user and the tailgater of FIG. 8A reaching an access point of the protected resource of FIG. 8A;

FIG. 8C depicts the user and the tailgater of FIGS. 8A and 8B passing through the access point of the protected resource of FIGS. 8A and 8B;

FIG. 8D depicts the user and the tailgater of FIGS. 8A-8C inside of the protected resource of FIGS. 8A-8C;

FIG. 12A depicts a tailgater entering a protected resource while a user holds open a door of the protected resource in accordance with still other embodiments of the present disclosure;

FIG. 12B also depicts a tailgater entering a protected resource while a user holds open a door of the protected resource in accordance with still other embodiments of the present disclosure;

DETAILED DESCRIPTION

Copyright And Legal Notices

Figure 1:
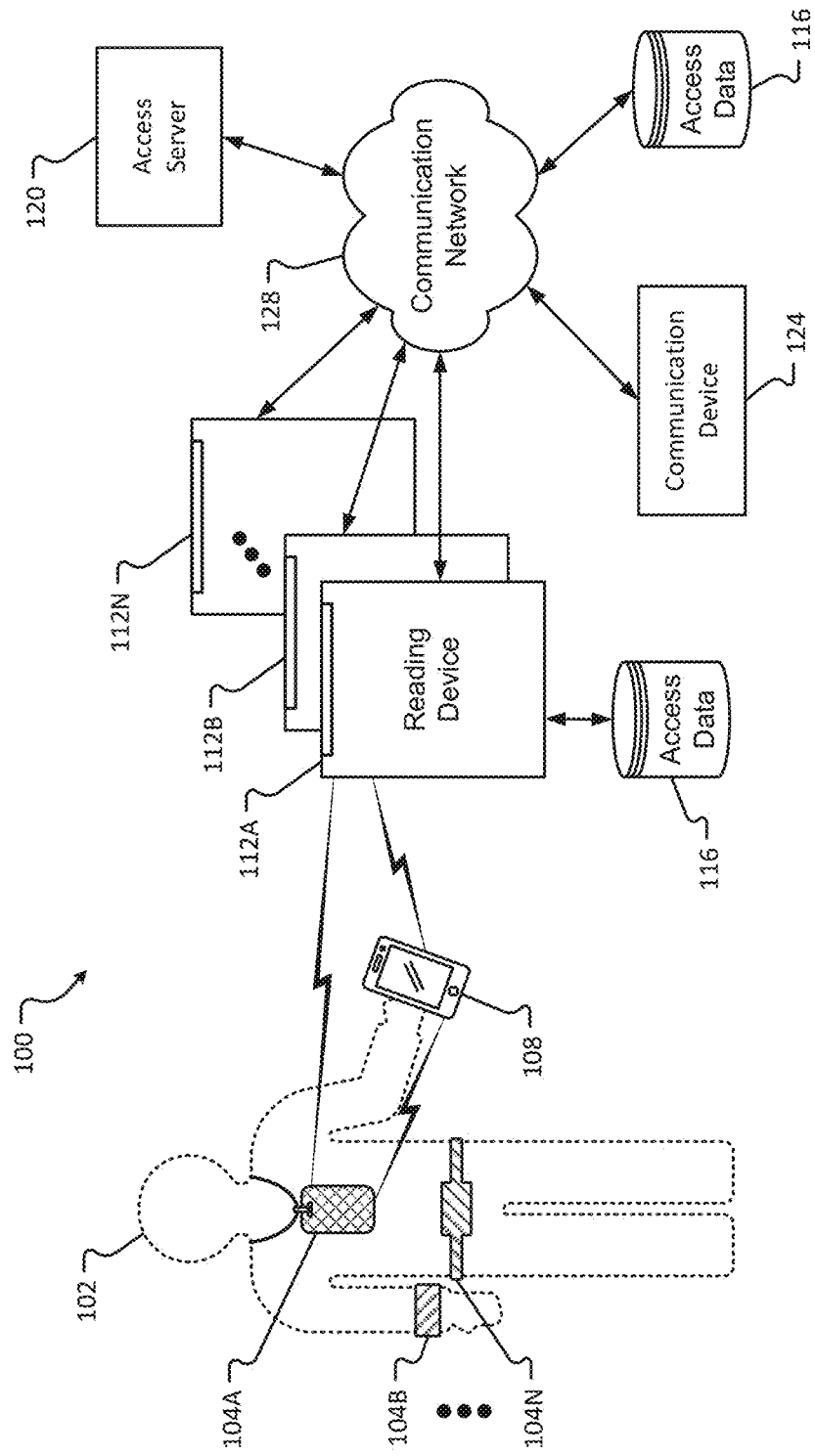
FIG. 1 is a diagram depicting an access control system in accordance with embodiments of the present disclosure.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

One advantage of mobile devices as credentials, as opposed to, for example, RFID tags, is that mobile devices are generally capable of beyond-near-field communications using communication protocols such as Bluetooth, BLE, WiFi, ZigBee, infrared, sound, light, etc. In access control systems comprising a reader configured to communicate with a mobile device using one or more such communication protocols, the mobile device can communicate information to the reader even when it is not in close proximity to (e.g., more than 1.0 m away from) the reader. Additionally, storing credentials on mobile devices, which users typically carry (or wear) for other purposes, allows users to carry fewer objects. And mobile devices are typically equipped with various sensors not included in traditional RFID tags. Still further, mobile devices typically have greater processing power than traditional RFID tags. As described herein, these advantages may be exploited to allow an access control system to determine whether a particular individual is entering into or exiting out of a protected resource.

According to one embodiment of the present disclosure, an access control reader includes a processor, a wireless communication interface, a lock control mechanism, and a memory storing instructions for execution by the processor. The instructions, when executed by the processor, cause the processor to evaluate credentials received via the wireless communication interface to make an access control determination, operate the lock control mechanism based on the access control determination, and make an ingress or egress determination based on information received via the wireless communication interface.

In the foregoing embodiment, making the ingress or egress determination may include evaluating the variation over time of a distance between two mobile devices based on the information. Additionally or alternatively, the ingress or egress determination may include determining a distance based on RSSI or time-of-flight information, correlating information about muscle expansion or contraction with one of an ingress event or an egress event, correlating information from one or more accelerometers with one of an ingress event or an egress event, comparing the information received via the wireless communication interface with other information stored in the memory, and/or comparing a first distance with a second distance (in which case the first distance and the second distance may be determined using the processor, or may be included in the information received via the wireless communication interface).

Further with respect to the foregoing embodiment, the other information stored in the memory may include information about the relative distance between two mobile devices during an ingress event. The access control reader may further include a wired or wireless transmitter, and the memory may store additional instructions that, when executed by the processor, further cause the processor to store the ingress or egress determination in the memory and send the ingress or egress determination to a predetermined computing device via the transmitter.

According to another embodiment of the present disclosure, a method for making an ingress or egress determination with an access control system includes identifying, with a processor, a plurality of mobile devices within communication range of an access control reader; receiving first information from at least one of the plurality of mobile devices, the first information corresponding to a first distance between at least two of the plurality of mobile devices; receiving second information from at least one of the plurality of mobile devices, the second information corresponding a second distance between at least two of the plurality of mobile devices; and making an ingress or egress determination for a user of the mobile device with respect to a portal protected by the access control reader based on the first information and the second information. The method may further include storing the ingress or egress determination in a memory of the access control reader; generating an access point profile based on a plurality of stored ingress or egress determinations from the memory of the access control reader; and transmitting the access point profile from the access control reader.

In the foregoing method, making the ingress or egress determination may include comparing the first distance with the second distance, and/or calculating a change in distance over time based on the first distance and the second distance and comparing the change in distance over time to third information stored in a memory of the access control reader.

The first information may include RSSI information or time-of-flight information. Also, making the ingress or egress determination may be further based on information corresponding to muscle expansion or contraction.

In another embodiment according to the present disclosure, a mobile device may include a processor, a wireless communication interface, and a memory in communication with the processor. The memory may storing access control credentials and instructions for causing the processor to track, based on information received via the wireless communication interface, a distance to another mobile device over a period of time. The memory may further store instructions for causing the processor to store information corresponding to the tracked distance in the memory, and transmit the access control credentials and the information corresponding to the tracked distance via the wireless communication interface. The information received via the wireless communication interface may correspond to RSSI information or time-of-flight information. The mobile device may further comprise a sensor, and the memory may store additional instructions further causing the processor to store sensor information received from the sensor during the period of time in the memory and transmit the sensor information via the wireless communication interface.

FIG. 1 is a diagram depicting an access control system 100 for authenticating a user 102 via wearable devices 104 in accordance with embodiments of the present disclosure. In one embodiment, the access control system 100 comprises at least one reading device 112, at least one wearable device 104, and at least one portable/mobile device 108. The reading device 112 may include an access data memory 116. The access data memory 116 may be configured to store access information, identification data, rules, program instructions, and/or other data associated with performing access operations of an access control system 100. In some embodiments, the reading device 112 may be configured to communicate with an access data memory 116 across a communication network 128. The access data memory 116 may be located remotely, locally, and/or locally and remotely, from the reading device 112.

The wearable device 104 and/or the mobile device 108 may be configured to communicate with a reading device 112 across one or more wireless communication connections. These one or more wireless communication connections can include communications via at least one of conventional radio protocols, proximity-based wireless communication protocols, Bluetooth™, BLE, infrared, audible, NFC, RF, and other wireless communication networks and/or protocols. In some cases, communications between the wearable device 104 and the reading device 112 may be established automatically when the wearable device 104 enters an active zone of an interrogating reading device 112. In one embodiment, the active zone of the reading device 112 may be defined as a three-dimensional space where the intensity of RF signals emitted by the reading device 112 exceeds a threshold of sensitivity of the wearable device 104 and the intensity of RF signals emitted by the wearable device 108 exceeds a threshold of sensitivity of the reading device 112.

In some embodiments, the wearable device 104 and/or mobile device 108 may be configured to communicate with a reading device 112 across a communication network 128. The communication network 128 can include communication via at least one of conventional radio networks, wireless communication networks, Zig-Bee, GSM, CDMA, WiFi, and/or using other communication networks and/or protocols as provided herein.

In one embodiment, authentication may be required between the wearable device 104 and the reading device 112 before further communications are enabled. Additionally or alternatively, authentication may be required between the wearable device 104 and the mobile device 108 before further communications are enabled. In any event, the further communications may provide communications in which access control information (e.g., keys, codes, credentials, etc.) are shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information from the wearable device 104 and/or the mobile device 108. This access control information may be used to validate the wearable device 104 and/or the mobile device 108 to the reading device 112. Validation may include referring to information stored in access data memory 120 or some other memory associated with the wearable device 104 and/or the mobile device 108. Typically, a reading device 112 is associated with a particular physical or logical asset (e.g., a door protecting access to a secure room, a computer lock protecting sensitive information or computer files, a lock on a safe, and the like). In one embodiment, the wearable device 104 and/or the mobile device 108 may be validated via one or more components of the access control system 100. Once the wearable device 104 and/or the mobile device 108 is authenticated, credential information associated with the wearable device 104 may be validated. During this process, the reading device 112 may generate signals facilitating execution of the results of interrogating the wearable device 104 (e.g., engages/disengages a locking mechanism, allows/disallows movement of a monitored article, temporarily disables itself, activates an alarm system, provides access to a computer system, provides access to a particular document, and the like). Alternatively, the access server 120 or some other system backend component may generate such signals.

In accordance with embodiments of the present disclosure, the reading device 112 may collect access control information associated with the wearable device 104 before an access control decision can be made. For example, the reading device 112 may require credential information stored on the wearable device 104 to validate the wearable device 104. The validity of the wearable device 104 may be based on the validity of an associated mobile device 108, or vice versa. In one embodiment, upon validating credential information stored on the wearable device 104, the reading device 112 generates signals facilitating execution of the results of interrogating the wearable device 104 and/or the mobile device 108 (e.g., engages/disengages a locking mechanism, allows/disallows movement of a monitored article, temporarily disables itself, activates an alarm system, provides access to a computer system, provides access to a particular document, and the like). As provided above, the access server 120 may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 116. Like the memory of the access server 120, the access data memory 116 may comprise a solid state memory or devices. The access data memory 116 may comprise a hard disk drive or other random access memory.

In some embodiments, the reading device 112 may be configured to communicate with one or more devices across a communication network 128. For example, the reading device 112 may communicate with a wearable device 104 and/or a mobile device 108 across the communication network 128. Among other things, this communication can allow for back-end authentication and/or provide notifications from the reading device 112 to the mobile device 108. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the wearable device 104 via the reading device 112.

Figure 2:
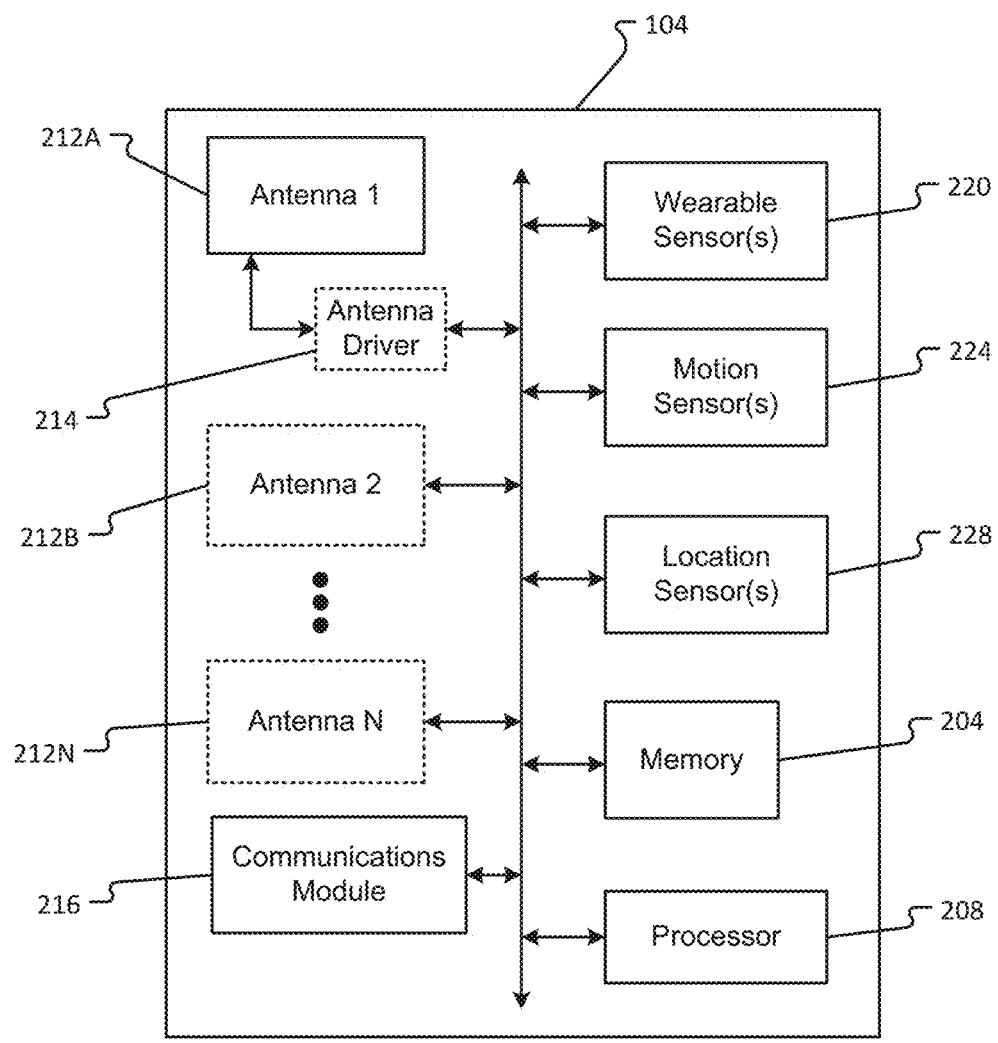
FIG. 2 is a block diagram depicting a wearable device or components thereof in accordance with embodiments of the present disclosure.

Referring now to FIG. 2, a block diagram depicting a wearable device 104 is shown in accordance with embodiments of the present disclosure. The wearable device 104 may include one or more components, such as, a memory 204, a processor 208, an antenna 212A-N, a communications module 216, a wearable sensor 220, a motion sensor 224, and a location sensor 228. In some embodiments, the wearable device 104 may further include a power module. The processor 208 may be an application specific integrated circuit (ASIC), microprocessor, programmable controller, or the like.

The memory 204 of the wearable device 104 may be used in connection with the execution of application programming or instructions by the processor 208, and for the temporary or long term storage of program instructions and/or data. The memory 204 may contain executable functions that are used by the processor 208 to run other components of the wearable device 104. In one embodiment, the memory 204 may be configured to store credential information and/or access control information. For instance, the credential information/access control information may include, but is not limited to, unique identifications, manufacturer identification, passwords, keys, encryption schemes, transmission protocols, and the like. As examples, the memory 204 may comprise RAM, DRAM, SDRAM, or other solid state memory.

The one or more antennas 212A-N may be configured to enable wireless communications between the wearable device 104 and a reading device 112 and/or mobile device 108. As can be appreciated, the antenna(s) 212A-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 212A-N may be RF antenna(s), and as such, may transmit RF signals through free-space to be received by a reading device 112 having an RF transceiver.

In some embodiments, the wearable device 104 may include a power module. The power module may be configured to provide power to the parts of the wearable device 104 in order to operate. The power module may store power in a capacitor of the power module. In one embodiment, electronics in the power module may store energy in the capacitor and turn off when an RF field is present. This arrangement can ensure that energy is presented to the wearable device 104 minimizing any effect on read distance. Although the wearable device 104 may be configured to receive power passively from an electrical field of a reading device 112, it should be appreciated that the wearable device 104 may provide its own power. For example, the power module may include a battery or other power source to supply power to parts of the wearable device 104.

The wearable device 104 may include a communications module 216 that is configured to communicate with one or more different systems or devices either remotely or locally to the wearable device 104. Thus, the communications module 216 can send or receive messages from other wearable devices 104, from mobile devices 108, from reading devices 112, from communication devices 124, from access servers 120, from access control systems, or from other systems. In some embodiments, the communicated information may be provided to, or exchanged with, other components within the wearable device 104.

Embodiments of the wearable device 104 may include at least one wearable sensor 220. Among other things, the wearable sensor 220 may be configured to detect an attachment and/or detachment of the wearable device 104 to a user 102. For instance, a wearable device 104 may include a clasp that is required to be opened in attaching and/or removing the wearable device 104 from a user 102 (e.g., similar to a clasp of a watch band, bracelet, earring, necklace, etc.). The actuation of the clasp may be detected by a wearable sensor 220 of the wearable device 104. Examples of other wearable sensors 220 may include, but are in no way limited to, contact sensors, switches, proximity sensors, etc., and/or combinations thereof.

In some embodiments, the wearable device 104 may employ one or more sensors 220, 224, 228 that are configured to detect information corresponding to a state of the wearable device 104. The wearable sensors 220 may include, but are not limited to, one or more biometric sensors (e.g., heart rate, body temperature and/or heat signature, blood pressure, etc.), capacitive sensors, light sensors, temperature sensors, pressure sensors, contact sensors, combinations thereof, and the like. It is an aspect of the present disclosure that the processor 208 of the wearable device 104 may receive the sensor information and determine whether the wearable device 104 is being worn by a user 102, whether the wearable device 104 has been removed from a user 102, whether any interruption to the wearing of the wearable device 104 is detected (e.g., whether the wearable device 104 has been continuously worn by, and/or removed from, a user 102, timing associated therewith, etc.). By way of example, the biometric sensor of the wearable sensors 220 may detect biometric characteristics associated with a user 102 wearing the wearable device 104 (e.g., a heart rate, a blood pressure, a body temperature, skin contact data, etc.). The biometric characteristics may be used to determine a state of the wearable device 104 (e.g., being worn or not, etc.) and/or determine an identity of a user 102 wearing the wearable device 104 (e.g., via comparing collected biometric characteristics to baseline characteristics stored in a memory and associated with the user 102, etc.).

The motion sensors 224 may include one or more of a gyroscope, accelerometer, transducer, and/or other mechanical detection component that are each configured to detect a force and/or motion associated with the wearable device 104. This detected motion of the wearable device 104 may be compared, via the processor 208 of the wearable device 104, to known motion profiles stored in the memory 204 or other associated memory in determining a state of the wearable device 104. For instance, a particular motion of the wearable device 104 may indicate that the wearable device 104 is being worn by a user 102. In one embodiment, the detected motion of a wearable device 104 may be compared to the detected motion of an associated mobile device 108, or vice versa, to generate comparison results. The association of the mobile device 108 may be between the wearable device 104 and/or between a user 102 having the wearable device 104. In any event, the comparison results may indicate similarities between the motion of the wearable device 104 and a motion of the mobile device 108 over time. Similar motion comparison results between the wearable device 104 and the mobile device 108 may allow a continuous authentication for the user 102. Additionally, motion comparison results (or simply detected motion information) may be used by the wearable device 104, the mobile device 108, and/or the reader 112 to assist in making an ingress or egress determination for the mobile device 108 and/or the wearable device 104. Dissimilar motion comparison results between the wearable device 104 and the mobile device 108 may be used to disable or discontinue the continuous authentication for the user 102. In one embodiment, an extreme motion detected at one device (e.g., the wearable device 104 or the mobile device 108) but not the other device may cause continuous authentication to be broken, discontinued, and/or disallowed.

The wearable device 104 may include one or more location sensors 228. The location sensors may be configured to determine a geographical location and/or position of the wearable device 104. In one embodiment, this location may be based on Global Positioning System (GPS) data provided by a GPS module of the wearable device 104. In some embodiments, the location of the wearable device 104 may be provided based on cell tower data, WiFi information, iBeacon information, and/or some other location information provided by a location module and/or a communications module 216 of the wearable device 104. The location of a mobile device 108 may be determined in a similar, if not identical, manner as determining the location of the wearable device 104. Although location information may not always be available inside buildings or other structures, location information provided by the one or more location sensors 228 may be used, where available, to make an ingress or egress determination for the wearable device 104 and/or the mobile device 108.

Figure 3:
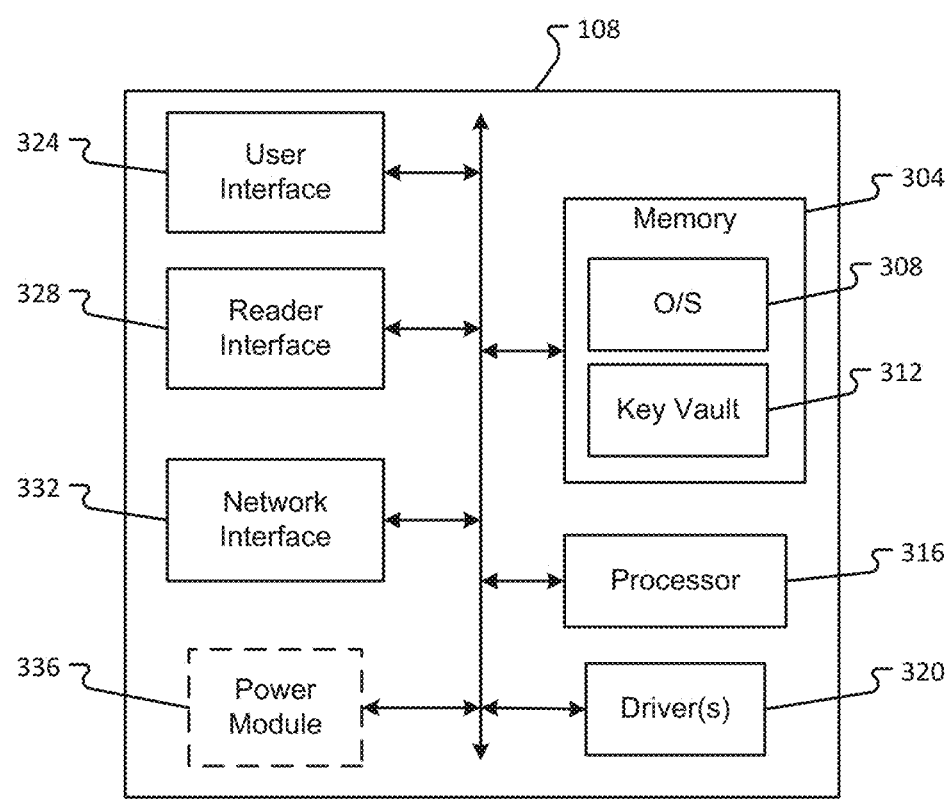
FIG. 3 is a block diagram depicting a mobile device or components thereof in accordance with embodiments of the present disclosure

FIG. 3 shows a block diagram depicting a mobile device 108 in accordance with embodiments of the present disclosure. The mobile device 108 may correspond to any type of electronic device and, as the name suggests, the electronic device may be portable in nature. As some examples, the mobile device 108 may correspond to a cellular phone or smartphone carried by a user. Other examples of a mobile device 108 include, without limitation, wearable devices (e.g., glasses, watches, shoes, clothes, jewelry, wristbands, stickers, etc.). The mobile device 108, as shown in FIGS. 1 and 3, may be provided with a key vault 312 that stores one or a plurality of keys. The key(s) may be communicated to a reader 112 in connection with a holder of the mobile device 108 attempting to gain access to an asset protected by the reader 112. As an example, the mobile device 108 may be presented to the reader 112 by a user 102 or holder of the mobile device 108.

If NFC is being used for the communication channel, then the reader 112 and mobile device 108 may have their interfaces/antennas inductively coupled to one another at which point the reader and/or mobile device 108 will authenticate or mutually authenticate with one another. Following authentication, the reader 112 may request a key or multiple keys from the mobile device 108, or the mobile device 108 may offer a key or multiple keys to the reader 112. Upon receiving the key(s) from the mobile device 108, the reader 112 may analyze the key(s) and determine if the key(s) are valid and, if so, allow the holder/user of the mobile device 108 access to the asset protected by the reader 112. It should be appreciated that the mobile device 108 may alternatively or additionally be configured to analyze information received from the reader 112 in connection with making an access control decision and/or in connection with making a decision whether or not to provide key(s) to the reader 112. Examples of technologies that can be used by the mobile device 108 to make an access control decision for itself are further described in U.S. Pat. No. 8,074,271 to Davis et al. and U.S. Pat. No. 7,706,778 to Lowe, both of which are hereby incorporated herein by reference in their entirety.

If BLE or some other non-inductive protocol (e.g., Wi-Fi) is being used for the communication channel, then the reader 112 and mobile device 108 may perform a discovery routine prior to pairing with one another or otherwise connecting to establish the communication channel. After the channel is established, however, the reader 112 and mobile device 108 may then authenticate one another and exchange relevant information, such as the key(s), to enable an access control decision to be made. If a positive access control decision is made (e.g., it is determined that the key(s) are valid and the mobile device 108 is allowed to access the asset protected by the reader 112), then the reader 112 may initiate one or more actions to enable the holder/user 102 of the mobile device 108 to access the asset protected by the reader 112.

The mobile device 108 is shown to include computer memory 304 that stores one or more Operating Systems (O/S) 308 and a key vault 312, among other items. The mobile device 108 is also shown to include a processor 316, one or more drivers 320, a user interface 324, a reader interface 328, a network interface 332, and a power module 336. Suitable examples of a mobile device 108 include, without limitation, smart phones, PDAs, laptops, PCs, tablets, netbooks, wearable devices, and the like.

The memory 304 may correspond to any type of non-transitory computer-readable medium. In some embodiments, the memory 304 may comprise volatile or non-volatile memory and a controller for the same. Non-limiting examples of memory 304 that may be utilized in the mobile device 108 include RAM, ROM, buffer memory, flash memory, solid-state memory, or variants thereof.

The O/S 308 may correspond to one or multiple operating systems. The nature of the O/S 308 may depend upon the hardware of the mobile device 108 and the form factor of the mobile device 108. The O/S 308 may be viewed as an application stored in memory 304 that is processor-executable. The O/S 308 is a particular type of general-purpose application that enables other applications stored in memory 304 (e.g., a browser, an email application, an SMS application, etc.) to leverage the various hardware components and driver(s) 320 of the mobile device 108. In some embodiments, the O/S 308 may comprise one or more APIs that facilitate an application's interaction with certain hardware components of the mobile device 108. Furthermore, the O/S 308 may provide a mechanism for viewing and accessing the various applications stored in memory 304 and other data stored in memory 304.

The processor 316 may correspond to one or many microprocessors that are contained within the housing of the mobile device 108 with the memory 304. In some embodiments, the processor 316 incorporates the functions of the user device's Central Processing Unit (CPU) on a single Integrated Circuit (IC) or a few IC chips. The processor 316 may be a multipurpose, programmable device that accepts digital data as input, processes the digital data according to instructions stored in its internal memory, and provides results as output. The processor 316 implement sequential digital logic as it has internal memory. As with most known microprocessors, the processor 316 may operate on numbers and symbols represented in the binary numeral system.

The driver(s) 320 may correspond to hardware, software, and/or controllers that provide specific instructions to hardware components of the mobile device 108, thereby facilitating their operation. For instance, the user interface 324, reader interface 328, and network interface 332, may each have a dedicated driver 320 that provides appropriate control signals to effect their operation. The driver(s) 320 may also comprise the software or logic circuits that ensure the various hardware components are controlled appropriately and in accordance with desired protocols. For instance, the driver 320 of the reader interface 328 may be adapted to ensure that the reader interface 328 follows the appropriate proximity-based protocols (e.g., BLE, NFC, Infrared, Ultrasonic, IEEE 802.11N, etc.) such that the reader interface 328 can exchange communications with the credential. Likewise, the driver 320 of the network interface 332 may be adapted to ensure that the network interface 332 follows the appropriate network communication protocols (e.g., TCP/IP (at one or more layers in the OSI model), UDP, RTP, GSM, LTE, Wi-Fi, etc.) such that the network interface 332 can exchange communications via the communication network 128. As can be appreciated, the driver(s) 320 may also be configured to control wired hardware components (e.g., a USB driver, an Ethernet driver, etc.).

As mentioned above, the user interface 324 may comprise one or more user input devices and/or one or more user output devices. Examples of suitable user input devices that may be included in the user interface 324 include, without limitation, buttons, keyboards, mouse, touch-sensitive surfaces, pen, camera, microphone, etc. Examples of suitable user output devices that may be included in the user interface 324 include, without limitation, display screens, touchscreens, lights, speakers, etc. It should be appreciated that the user interface 324 may also include a combined user input and user output device, such as a touch-sensitive display or the like.

The reader interface 328 may correspond to the hardware that facilitates communications with the credential for the mobile device 108. The reader interface 328 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 328 is specifically provided to facilitate proximity-based communications with a credential via communication channel or multiple communication channels.

The network interface 332 may comprise hardware that facilitates communications with other communication devices over the communication network 128. As mentioned above, the network interface 332 may include an Ethernet port, a Wi-Fi card, a Network Interface Card (NIC), a cellular interface (e.g., antenna, filters, and associated circuitry), or the like. The network interface 332 may be configured to facilitate a connection between the mobile device 108 and the communication network 128 and may further be configured to encode and decode communications (e.g., packets) according to a protocol utilized by the communication network 128.

The power module 336 may include a built-in power supply (e.g., battery) and/or a power converter that facilitates the conversion of externally-supplied AC power into DC power that is used to power the various components of the mobile device 108. In some embodiments, the power module 336 may also include some implementation of surge protection circuitry to protect the components of the mobile device 108 from power surges.

Figure 4A:
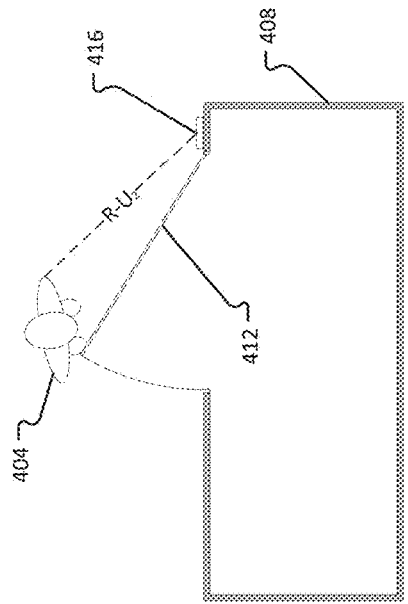
FIG. 4A depicts a user approaching an access point to a protected resource in accordance with embodiments of the present disclosure.
Figure 4B:
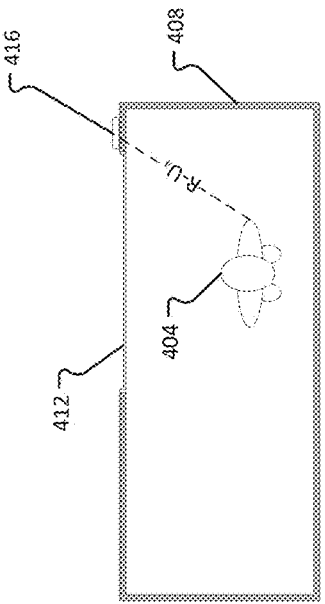
FIG. 4B depicts a user opening a door of an access point to a protected resource in accordance with embodiments of the present disclosure.
Figure 4C:
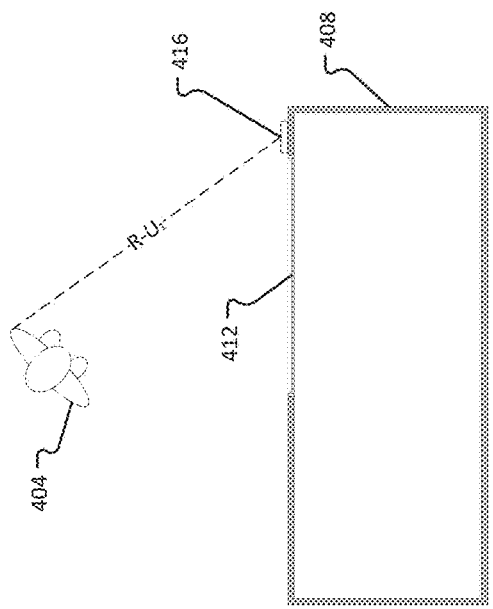
FIG. 4C depicts a user passing through an access point to a protected resource in accordance with embodiments of the present disclosure.
Figure 4D:
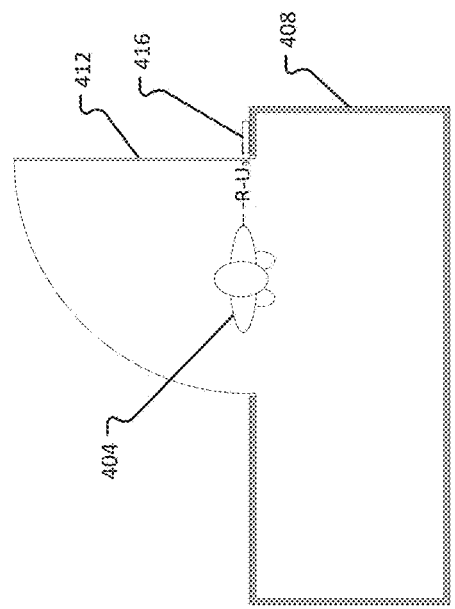
FIG. 4D depicts a user inside of a protected resource in accordance with embodiments of the present disclosure.

Turning now to FIGS. 4A-4D, in a basic ingress scenario, an individual 404 wishing to enter a protected resource 408 will approach the access point (e.g. door 412) controlled by the access control system, which comprises a reader 416 that comprises or is in operable communication with a lock on the door, as depicted in FIG. 4A. The reader 416 may correspond to an example of a reading device 112A-N. As the individual 404 approaches the door 412, a mobile device 104, 108 of the individual 404 (which may be a wearable device) communicates a mobile key or other authentication credentials to the access control system reader 416. In some embodiments, depending on the capabilities and requirements of the access control system in question, the individual 404 may be required to physically place the mobile device (or some other credential-bearing device) within a given distance (e.g. within communication range) of the reader 416, which may be dictated by the communication protocol(s) used by the reader 416. Once the reader 416 verifies the presented credentials (e.g. determines that the mobile key is valid and corresponds to a user authorized to access the protected resource 408) and unlocks the door 412, the individual 404 will either push or pull on the door 412 to open it. In FIG. 4B, for example, the individual 404 pulls on the door 412 to open it. In so doing, various muscles of the individual 404 (e.g. arm muscles of the individual 404)

will contract or extend; one or more appendages (e.g. arms, legs) of the individual 404 will move relative to the body of the individual 404, and the body of the individual 404 (and mobile devices being carried or worn by the individual 404) will be subjected to certain accelerations/decelerations. Once the door 412 is open (or as the door 412 is opening), the individual 404 will walk through the doorway, as shown in FIG. 4C. The door 412 will then close and lock, as shown in FIG. 4D, until another individual arrives with proper credentials.

A basic egress scenario is very similar. The individual walks up to the access point, which may or may not automatically unlock as she approaches. She then pulls or pushes on the door to open it, causing various of her muscles to contract or extend, and one or more of her appendages to move relative to her body. Once the door is open, she walks out of the protected resource.

In embodiments, an access control system such as access control system 100 makes an ingress or egress determination based at least in part on information about the distance between two mobile devices on the person of the individual or user, one or both of which may be in communication with the access control system reader. In FIGS. 5A-5C, for example, a user 504 has a mobile device 508 such as a smart phone or tablet near her waist (e.g. in a pocket) and a wearable device 512 on the wrist of her right arm 504c. The distance between the two mobile devices 508 and 512 will vary in a fairly constant pattern as the user 504 walks up to (and away from) a door. For example, in FIG. 5A, as the user 504 steps forward with her left foot 504a, her right arm 504c swings forward and her left arm 504d swings backward. As the right arm 504c reaches its forward-most point, the distance $M-W_1$ between mobile device 508 and wearable device 512 reaches a local maximum. As the user 504 brings her right foot 504b forward, as shown in FIG. 5B, her right arm 504c swings back past her waist, thus bringing the wearable device 512 closer to the mobile device 508 such that distance $M-W_2$ is less than distance $M-W_1$. The distance between mobile device 508 and wearable device 512 will reach a local minimum when the right wrist of user 504 (to which wearable device 512 is affixed) is directly adjacent to the waist (to which mobile device 508 is attached) of user 504. Then, as the user 504 extends her right foot 504b, her right arm 504c swings back, as shown in FIG. 5C. When her right arm 504c reaches its rear-most point, the distance $M-W_3$ between mobile device 508 and wearable device 512 reaches another local maximum.

Figure 6A:
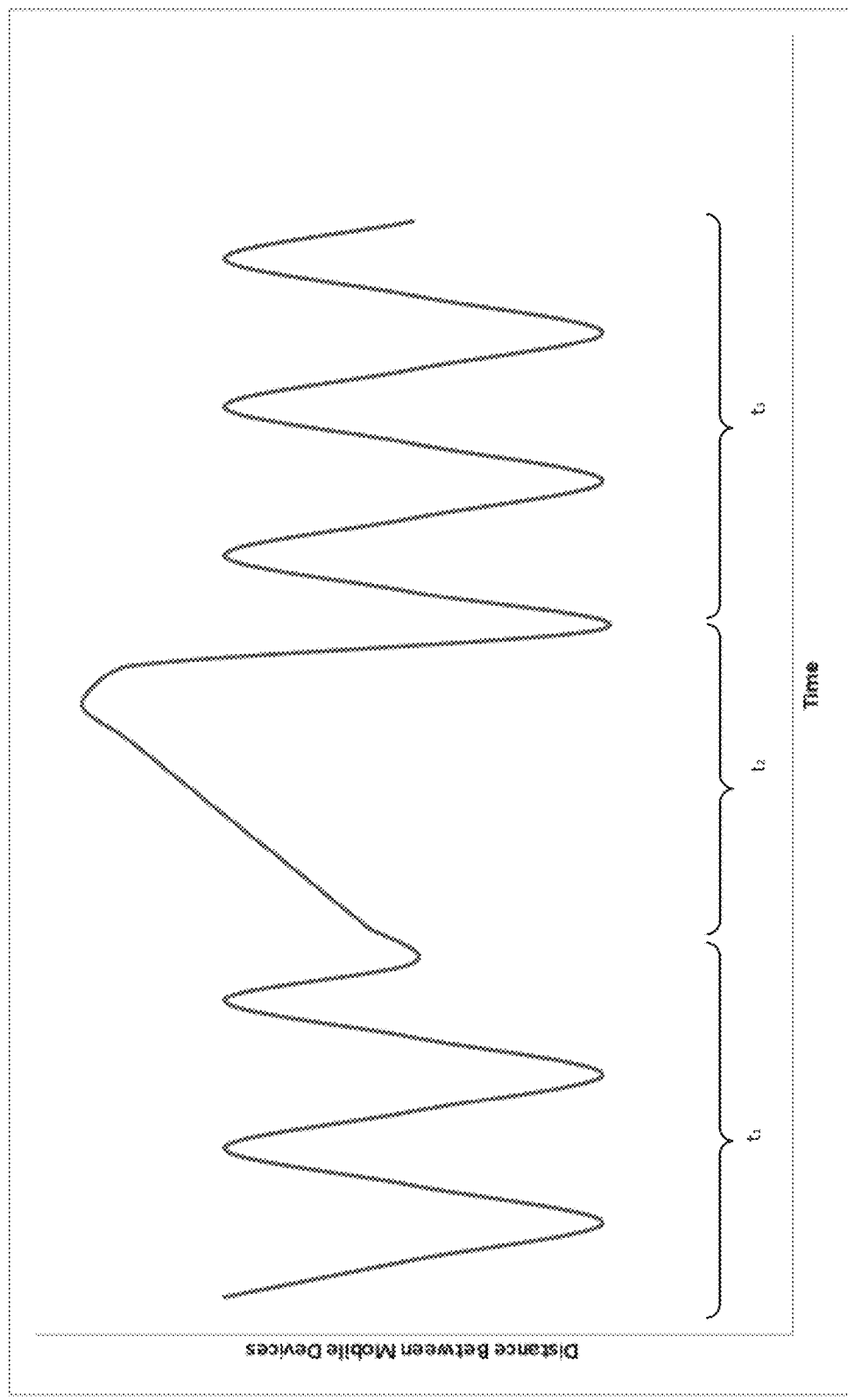
FIG. 6A is an illustrative graph of a distance between two mobile devices over time.

FIG. 6A provides an illustrative graph of the distance between the mobile device 508 and the wearable device 512 of a user 504 over time, as the user 504 walks up to a door, pushes it open, then walks through the door. If the door is one that must be pushed open to enter a protected resource and pulled open to exit the protected resource, then an access control system may use a graph (or the information represented by a graph) such as that depicted in FIG. 6A (e.g. by comparing the measured distance between a mobile device 508 and a wearable device 512 over time to a graph (or the information represented by a graph) such as that depicted in FIG. 6A) to determine that the user 504 has entered the protected resource. As the user 504 walks up to the door during time $t_1$, with a normal walking motion such as that described above with respect to FIGS. 5A-5C, the distance between the mobile device 508 and the wearable device 512 varies in a constant manner over time. Then, as the user 504 pushes the door open with her right arm/hand (to which the wearable device 512 is affixed) during time $t_2$, the pushing motion may cause an increase in the distance between the mobile device 508 and the wearable device 512, likely exceeding any increase in the distance between the two mobile devices 508 and 512 that occurred while the user 504 was walking (e.g. during time $t_1$). As the user 504 breaks contact with the door and resumes a normal walking motion through the doorway and beyond (e.g. during time $t_3$), the distance between the mobile device 508 and the wearable device 512 resumes its previous constantly varying pattern. By identifying the increase in distance associated with time $t_2$, (perhaps in part by identifying a break in the constant pattern resulting from the user walking up to the door and then walking away from the door during times $t_1$ and $t_3$), the access control system can make a determination that the user 504 entered the protected resource.

Figure 6B:
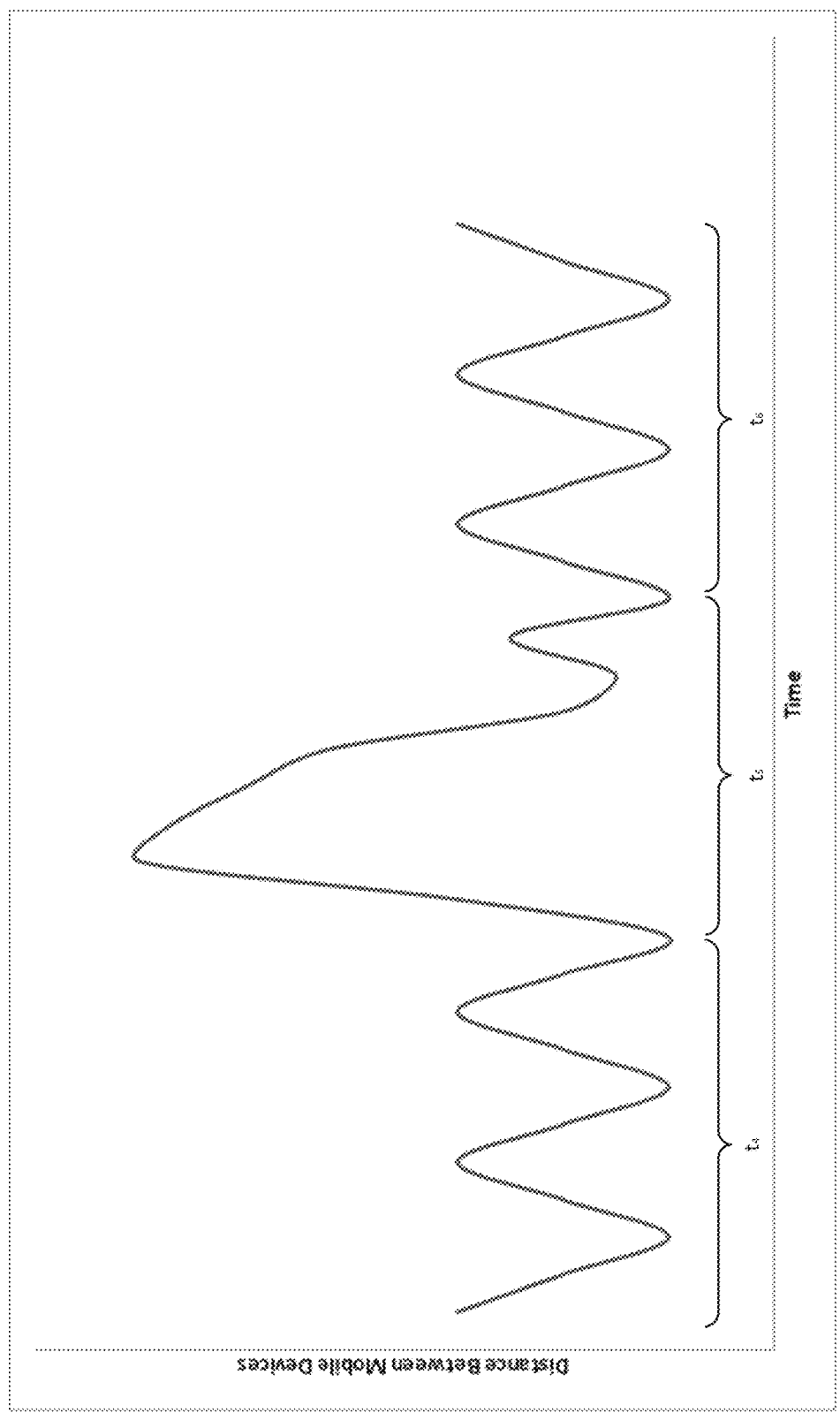
FIG. 6B is another illustrative graph of a distance between two mobile devices over time.

FIG. 6B provides an illustrative graph of the distance between the mobile device 508 and the wearable device 512 of the user 504 over time, as the user 504 walks up to a door (time $t_4$), pulls it open (time $t_5$), then walks through the door (time $t_6$). If the door is one that must be pulled open to exit the protected resource, then an access control system may use a graph (or the information represented by a graph) such as that depicted in FIG. 6B (e.g. by comparing the measured distance between a mobile device 508 and a wearable device 512 over time to a graph (or the information represented by a graph) such as that depicted in FIG. 6B) to determine that the user 504 has exited the protected resource. Here, as the user 504 reaches for and pulls on the door (e.g. during time $t_5$) with her right arm/hand, the distance between the two mobile devices (e.g. the mobile device 508 and the wearable device 512) may first quickly increase—likely to a greater maximum than when pushing the door open, as the user 504 must remain clear of the door as it opens—as the user 504 extends her hand to the door handle. The distance may then decrease, slightly at first as the user 504 pulls the door open while shifting her body back in the same direction, out of the way of the door, then more rapidly once the user's 504 body is no longer moving. The distance between the two mobile devices may reach a minimum as the geometric plane of the door passes through the body of the user 504, and may then increase again somewhat as the user 504 pulls the door past her body before returning to the same constant pattern associated with a normal walking motion during time $t_6$.

As evident from comparing the example graphs in FIGS. 6A and 6B, the change in distance between the mobile devices 508 and 512 over the duration of the pushing motion (e.g. during time $t_2$ of FIG. 6A) will be different than the change in distance between the mobile devices over the duration of the pulling motion (e.g. during time $t_5$ of FIG. 6B), which difference can be detected by the access control system to distinguish between those two events. By programming at least one of the components of the access control system (e.g. the reader or a mobile device) to correlate data representative of pushing with ingress, and data representative of pulling with egress (or vice versa, depending on the configuration of the access point in question), the system can identify and distinguish ingress and egress events.

Various techniques may be used to determine the distance between two mobile devices such as mobile device 508 and wearable device 512, and/or the distance between a mobile device (such as mobile device 508 or wearable device 512) and a reader (such as reader 416). In some embodiments, the distance is determined using Received Signal Strength Indication (RSSI), which describes the strength of a received wireless signal. Raw RSSI measurements may be used to calculate the distance traveled by the signal (based at least in part on the known attenuation of radio signal strength over distance), or they may be used to determine a distance using a lookup table that correlates raw RSSI measurements with pre-calculated distance values. Because only the change in distance between the mobile devices, rather than the actual distance between the mobile devices, is needed to make the ingress or egress determination as set forth above, the RSSI values themselves may be used as a proxy for actual distance values. For the same reason, in some embodiments, the ingress or egress determination may be made based on approximate distances between the mobile devices, which may be obtained using more simple calculations or less precise correlation tables than would be needed to determine exact distances.

In embodiments where a lookup table is used to correlate RSSI values with distance, the lookup table may include device-specific information (such that both an RSSI value and one or more device-specific data points are needed to look up the correlated distance), while in other embodiments, the lookup table may simply correlate RSSI values with distance values. Thus, in some embodiments the distance may be determined based solely on RSSI data, and in other embodiments the determined distance may be based on RSSI data and information about the mobile device in question, such as type (e.g. watch, glasses, wristband, etc.), transmitted signal strength, location (e.g. as determined using a mobile device's GPS, Wi-Fi positioning, multilateration), etc. In some embodiments, one or more of the mobile devices may have a plurality of receivers that can be used to measure RSSI.

In embodiments, one or both of two mobile devices may send raw RSSI measurements to a reader so that the reader can determine the distances and use those determined distances to make an ingress/egress determination, while in other embodiments, one or both mobile devices may use raw RSSI measurements to make a distance determination and then send that information to the reader for use in making an ingress/egress determination. In still other embodiments, one or both of the mobile devices may make the ingress/egress determination based on the raw RSSI measurements, and simply provide the determination to the reader.

Distance determinations useful for making an ingress or egress determination may also be made based on the measured time-of-flight of a signal traveling between two mobile devices. As with distance determinations based on RSSI, a distance determined using time-of-flight information may be an actual calculated distance, an approximate distance, or a distance determined using a lookup table. Alternatively, the time-of-flight values may themselves be used a proxy for actual distances, and the change in the time-of-flight values over time used to make the ingress/egress determination. In embodiments using a lookup table to determine distance, the lookup table may correlate distances with a combination of time-of-flight values and device-specific information, or the lookup table may simply correlate time-of-flight values with distance values. Thus, in some embodiments the distance may be determined based solely on time-of-flight data, and in other embodiments the determined distance may be based on time-of-flight data and information about one or both of the mobile devices in question. In some embodiments, one or more mobile devices may have a plurality of receivers that can be used to measure time-of-flight.

While the example upon which the above discussion is based uses the distance between a wearable mobile device (a watch) and a mobile device in the user's pocket or purse (a smartphone or tablet), persons of skill in the art will recognize that the variations in distance between many other mobile device combinations when a user is pushing or pulling on a door will allow an ingress/egress determination to be made.

Figure 7A:
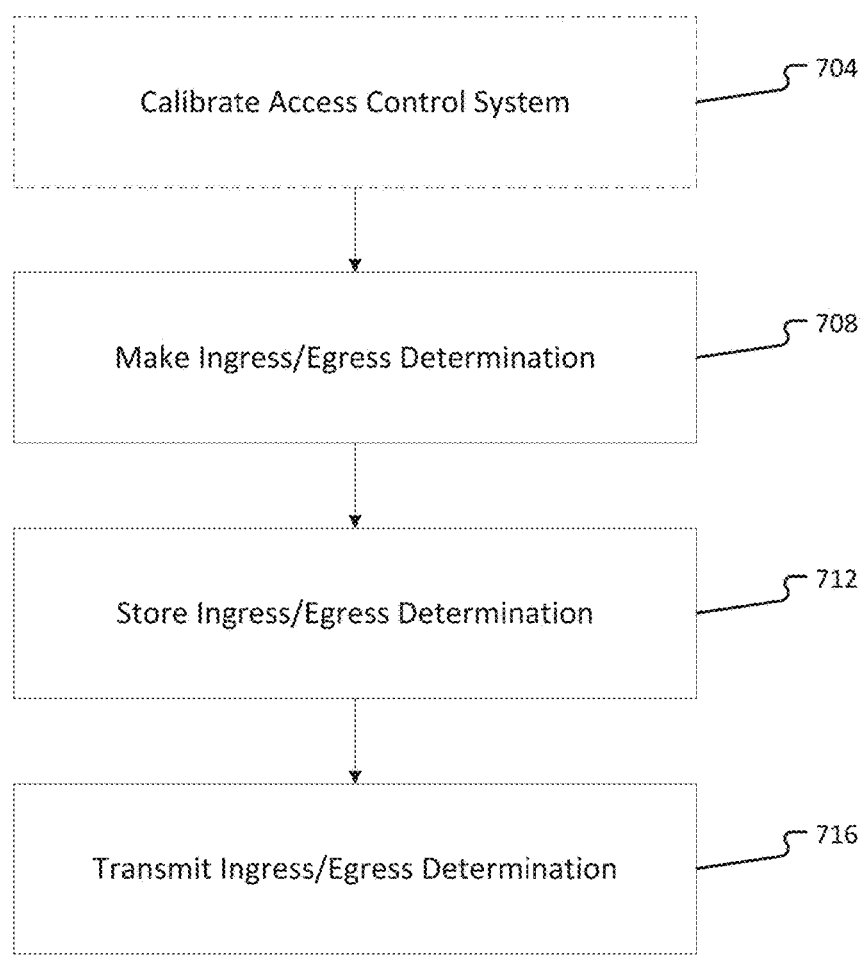
FIG. 7A is a flowchart depicting aspects of a method in accordance with embodiments of the present disclosure.

Turning now to FIG. 7A, a method for tracking ingress or egress determinations with an access control system may involve calibrating the access control system (step 704) (which may need to occur only occasionally); making an ingress/egress determination (step 708); storing the ingress/egress determination in the access control system (step 712); and transmitting to the ingress/egress determination to a computing device (e.g. of a system administrator) for analysis (step 716). These steps are described in more detail below.

Figure 7B:
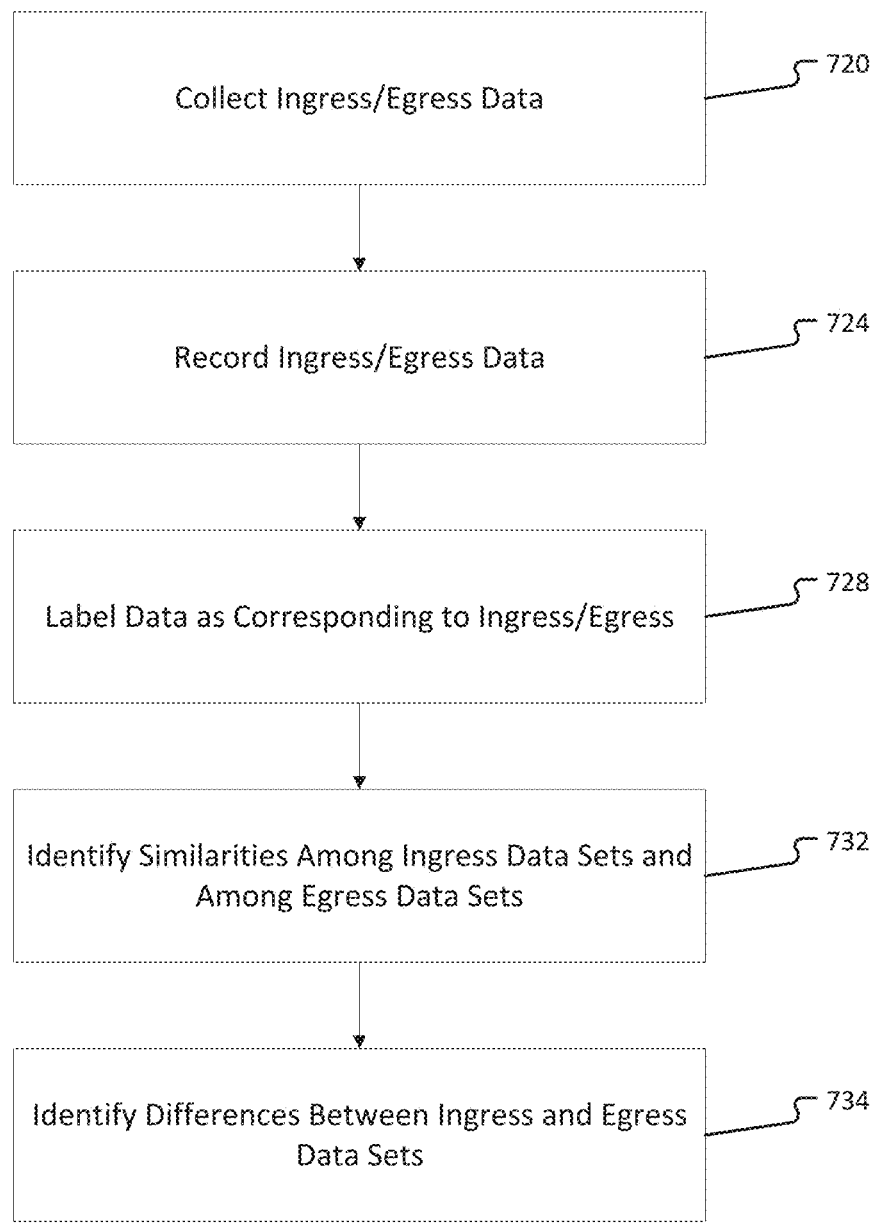
FIG. 7B is a flowchart depicting additional aspects of a method in accordance with embodiments of the present disclosure

FIG. 7B shows steps that may be included in the general step 704 of calibrating an access control system, which, in some embodiments, may be a prerequisite before an access control system can make ingress/egress determinations. In step 720, the access control system collects ingress/egress data. This may be done by having a user with a mobile device and a wearable device walk through an access point controlled by the access control system to be calibrated multiple times. To achieve a more robust calibration, multiple users with both a mobile device and a wearable device may walk through the access point multiple times. Further robustness may be achieved by having one or more users walk through the access point with different types of mobile devices and wearable devices. This may include using different types of mobile devices (e.g. different brands of smart phones, different brands of tablets, and so forth) and different types of wearable devices (e.g. different brands of smart watches, different brands of pendants, and so forth), and may also include carrying such devices in different places (e.g. carrying a mobile device in a pocket, a purse, and then a hand; wearing a smart watch on a right arm and then a left arm). Each time a user walks through the access point, the access control system (more specifically, e.g., a reader of the access control system proximate to the access point) collects data from one or both of the user's mobile device and wearable device. The data includes, in embodiments, information corresponding to the distance between the mobile device and the wearable device.

The access control system records the ingress/egress data it collects from each ingress/egress event (step 724). The access control system may record the ingress/egress data in computer-readable memory of the reader of the access control data that collects the data, or it may store the data in a computer-readable memory operably connected to the reader of the access control system (e.g. in a computer-readable memory of a central computer to which the reader is connected, or in a computer-readable memory accessible to the reader via a communication network).

Also as part of the calibration process, the data collected and recorded for each ingress/egress event is labeled as corresponding to an ingress or an egress event (step 728). A system administrator may manually input this information, or the system may be configured to assume that each event is an ingress or an egress according to a predetermined pattern (e.g. alternating ingress and egress).

Once data from a sufficient number of ingress/egress events have been recorded, the access control system, using a processor thereof (whether a processor in the reader, in the central computer of the access control system, or otherwise operably connected to the access control system), analyzes the recorded data to identify similarities among the recorded ingress data sets and further to identify similarities among the recorded egress data sets (step 732). This may involve, for example, identifying patterns, trends, or other information in the data that can be used to identify an ingress event or an egress event. When the data correspond to the distance between a mobile device and a wearable device, the patterns may relate to local maximum or minimum distances, changes in distance over time, rates of change in distance over time, and so forth. For example, the access control system may determine that ingress (or egress) events are characterized by a change in the distance between a mobile device and a wearable device over time such as that shown in FIG. 6A, and more particularly during time $t_2$ of FIG. 6A. As another example, the access control system may determine that egress (or ingress) events are characterized by a change in the distance between a mobile device and a wearable device over time such as that shown in FIG. 6B, and more particularly during time $t_5$ of FIG. 6B.

The access control system, using the processor, also analyses the recorded data to identify differences between ingress and egress data sets (step 734). More specifically, the access control system identifies patterns, trends, or other information that can be used to distinguish an ingress event from an egress event and vice versa. Here again, for example, the access control system may determine that ingress events may be distinguished from egress events based on the different rate of change of the distance between a mobile device and a wearable device during the event (e.g. the different rates of change during time $t_2$ of FIG. 6A and time $t_5$ of FIG. 6B).

Figure 7C:
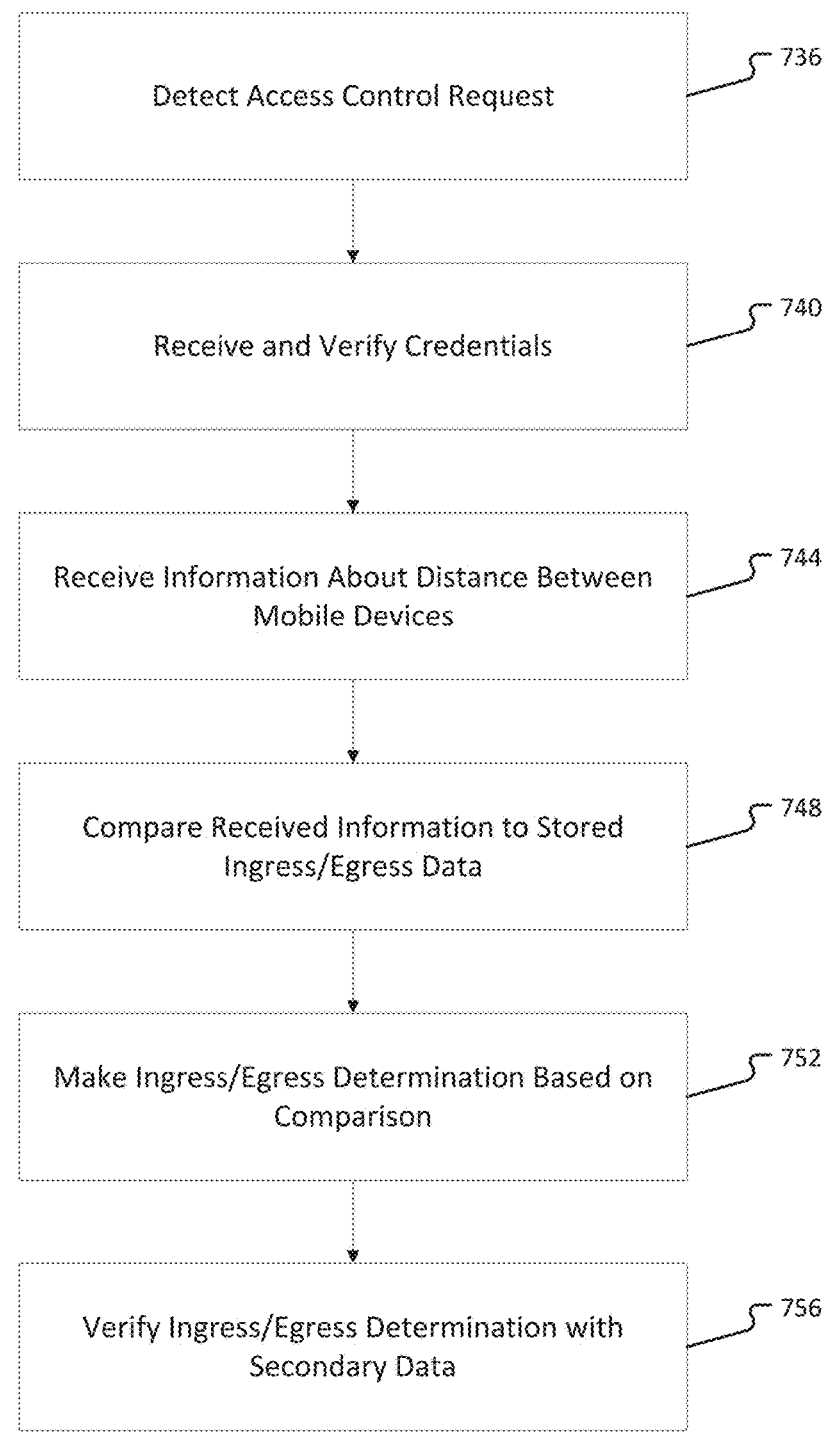
FIG. 7C is a flowchart depicting other aspects of a method in accordance with embodiments of the present disclosure.

Once the calibration process is complete, the access control system may be activated for automatic determination of ingress/egress. As shown in FIG. 7C, an ingress/egress determination may begin when a reader of an access control system detects an access control request from a mobile device or wearable device of a user approaching an access point controlled by the reader (step 736). Whether the mobile device or wearable device of the user contacts the reader first or vice versa is not particularly relevant to the present disclosure, and both possibilities are encompassed within the scope of the present disclosure.

The access control system reader may then receive and verify credentials from the mobile device or the wearable device of the user (step 740). Here again, the particular details of the credential verification process, including how the credentials are transmitted to the reader, how the credentials are verified by the reader, and how the access control decision is communicated to the mobile device or the wearable device (if at all), are not specific to the present disclosure. Any credential reception and verification process may be used within the scope of the present disclosure.

Having established communication with the mobile device and/or the wearable device of the user for purposes of credential verification, the access control system can maintain such communications to receive information needed to make an ingress/egress determination (step 744). The information may be received in real time, or it may be received after the event has concluded. The information may be sent by the mobile device and/or the wearable device automatically, or it may be requested by the access control system and sent by the mobile device and/or the wearable device in response to the request. In embodiments, the received information is stored in a computer-readable memory of the reader of the access control system that received the information, while in other embodiments the received information is sent by the reader to another component of the access control system (e.g. a computer-readable memory of a central computer of the access control system, or a stand-alone, network-accessible computer-readable memory).

The received information is then compared to stored ingress/egress data to determine whether it matches an ingress data profile or an egress data profile (step 748). The comparison may be made by a processor of the reader, or by another processor of the access control system. The latter option may be preferable when more powerful processors are available in components other than the access control system reader. The latter option may also be preferable if ingress and egress data profiles are stored in a central memory to which a processor other than the access control system reader processor has more ready access or faster access. Based on the comparison, the processor makes an ingress/egress determination (step 752).

Although the above description focuses on the use of a distance between a user's mobile device and the user's wearable device to make an ingress/egress determination, other information, including information gathered from one or more sensors on one or both of the mobile devices, may be used to confirm an ingress/egress determination (step 756). (Alternatively, such information may be used instead of distance information to make an ingress/egress determination in the first instance.) For example, a wearable mobile device may be equipped with one or more sensors that can sense the expansion or contraction of a muscle. Such sensors may, for example, detect or infer muscle expansion or contraction by measuring the pressure applied to various portions of the wearable mobile device. By correlating expansion and contraction patterns of the muscle, as determined from measurements obtained by the mobile device while a user is passing through an access point, with information corresponding to whether the user is entering or exiting, data from the sensor can be used to make an ingress/egress determination.

As another example, many mobile devices include an accelerometer or other motion sensor(s). By correlating measurements from one or more accelerometers on one or more of a user's mobile devices, taken while the user is pushing or pulling open an access point door, with information corresponding to whether the user is entering or exiting the protected resource, data from the accelerometer(s) can be used to make an ingress/egress determination. Accelerometer data may also be used to supplement other distance information for a more robust ingress/egress determination. For example, some accelerometers are configured to count the steps taken by a user, and therefore can be used to provide an indication of when a user is walking. This information can be used to confirm that a particular pattern in the distance between two mobile devices corresponds to the user walking and not to some other user motion.

When multiple types of information (e.g. distance information, motion sensor information, muscle contraction/expansion information, etc.) are available for use in making an ingress/egress determination, the determination may be made based on each type of information individually, after which the various determinations can be compared as a check on quality.

As identified above with respect steps 712 and 716 of FIG. 7A, once made, an ingress/egress determination can be stored by the access control system—for example, in the memory of the reader—and transmitted to a system administrator or other individual for analysis. In embodiments, the access control system may only store and/or transmit an ingress/egress determination that has been made based on one information type and confirmed based on at least one other information type. Collected ingress/egress information constitutes a profile for the access point in question, and may include various pieces of information, including the actual number of ingresses per hour; the actual number of egresses per hour; an average number of ingresses and/or egresses per hour, per day, per week, etc.; the difference in the number of ingresses and egresses for a given day; and so forth. Depending on the purpose(s) for which they will be used, averages may be calculated for a specific hour of a specific day (e.g. the average of the number of ingresses from 8:00 am until 9:00 am on Tuesday mornings), or for a specific hour only (e.g. the average of the number of egresses from 6:00 pm until 7:00 pm every day). Averages may also be calculated on a daily, weekly, monthly, or yearly basis.

An access point profile is useful for determining, for example, entrance or exit trends at the access point. When an access control system can make ingress/egress determinations with a high degree of accuracy, ingress/egress information may be used to determine how many people are in a protected resource at any given point in time. Such information may be useful, for example, for capping the number of people that may be in the protected resource (e.g. by configuring the reader to deny access to the protected resource even to persons with authorized credentials if the population cap of the protected resource has been met), or for verifying that all individuals have left the protected resource in an emergency.

In some embodiments, the access control system may update its ingress/egress data profiles (e.g. the profiles used to make each new ingress/egress determination) based on each ingress/egress determination made by the access control system. In other embodiments, the access control system may only update its ingress/egress data profiles when an ingress/egress determination based on one information type is confirmed by an ingress/egress determination based on at least one other information type (e.g. when an ingress/egress determination made using information about distances between two mobile devices is confirmed by an ingress/egress determination made based on information received from a sensor about muscle contraction or expansion, or from an accelerometer).

Sometimes, after a user presents credentials to a reader and opens an access point door, one or more tailgaters may pass through the controlled access point without needing to present their own credentials. Tailgaters present a challenge to proper tracking of ingress and egress events. In some instances, tailgaters will not have their own credentials and therefore will be effectively invisible to the access control system controlling the access point. This scenario may occur regardless of whether the protected resource is a home (where guests and even some occupants (children, for example) may not have credentials), a hotel room (where fewer than all of the guests staying in the room may have credentials), or an office or other place of employment (where visitors may not have credentials). To account for tailgaters without credentials, and even for users who have forgotten their credentials, some access control systems may be configured to allow for manual entry of ingress/egress events.

When tailgaters do have their own mobile devices, an ingress/egress determination can be made for them as well. Such a determination may be based on the change over time in the distance between a mobile device being carried or worn by the user who opens the access point and a mobile device being carried or worn by the tailgater (referred to hereafter as the U-T distance). With reference to FIGS. 8A-8D, a protected resource 804 has an access control system reader 808 adjacent an access point door 812. A primary user 816 walks through the access point followed by a tailgater 820. The distance between the reader 808 and a mobile device (whether a wearable mobile device or not) of the primary user is labeled as distance $R-U_n$, where n is used to represent a point in time (e.g. if a first value of n is lower than a second value of n, the first value represents a point in time earlier than the point in time represented by the second value). The distance between the reader 808 and a mobile device (whether a wearable mobile device or not) of the tailgater is labeled as distance $R-T_n$. The distance between a mobile device (whether a wearable mobile device or not) of the primary user 816 and a mobile device (whether a wearable mobile device or not) the tailgater 820 is labeled as distance $U-T_n$. If the $U-T_n$ distance remains relatively constant in a time period surrounding the ingress/egress event of the primary user 816—suggesting that the tailgater 820 is following the primary user 816—then the same ingress/egress determination that is made for the primary user 816 may be applied to the tailgater 820. Thus, in FIGS. 8A-8D, the distance $U-T_1$ is approximately equal to the distances $U-T_2$, $U-T_3$, and $U-T_4$, indicating that the tailgater 820 is following the primary user 816. The access control system protecting protected resource 804 may therefore make an ingress/egress determination for the primary user using any of the systems or methods described herein for making an ingress/egress determination, and may apply that same determination to the tailgater 820 based on the relatively constant value of $U-T_n$ during the time period relevant to making an ingress/egress determination for the primary user. This may be useful, for example, to reduce the processing power needed when large numbers of individuals are passing through the access point, or when a tailgater's mobile device(s) do not provide the information needed to make an independent ingress/egress determination.

On the other hand, if the $U-T_n$ distance (during a time period relevant to making an ingress/egress determination for a primary user) first decreases then increases during the time period in question—suggesting that a tailgater 820 is passing a primary user 816, headed in the opposite direction—then the opposite ingress/egress determination as that made for the primary user 816 may be applied to the tailgater 820. Regardless of the ultimate outcome of the ingress/egress determination for the tailgater 820, U-T distances (e.g. the distance between a mobile device of a user and a mobile device of a tailgater) may be determined or approximated in the same ways described above for calculating or approximating the distance between two mobile devices of a single user.

Figure 9B:
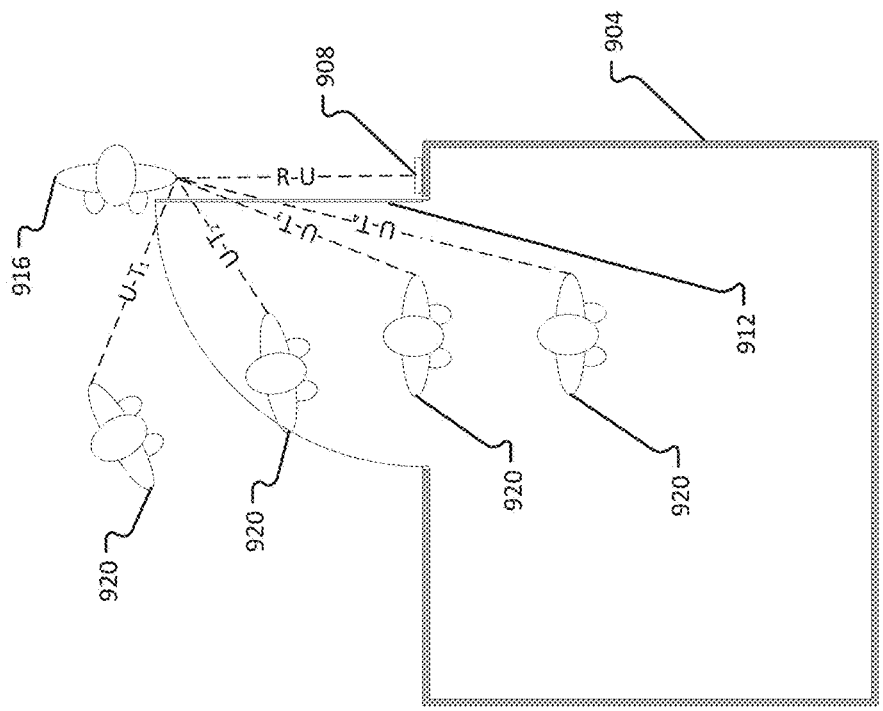
FIG. 9B also depicts a tailgater entering a protected resource while a user holds open a door of the protected resource in accordance with embodiments of the present disclosure.
Figure 9A:
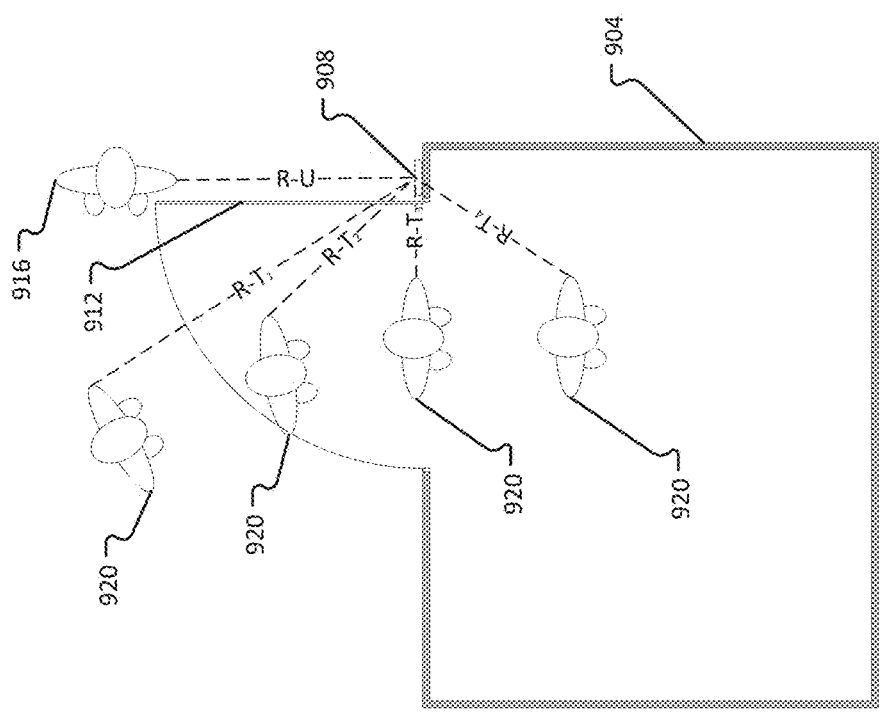
FIG. 9A depicts a tailgater entering a protected resource while a user holds open a door of the protected resource in accordance with embodiments of the present disclosure.

Turning now to FIGS. 9A-9B and 10A-10B, ingress/egress determinations may be made more complicated if and when a user 916 opens a door 912 (e.g. by presenting credentials, through the user's mobile device(s), to a reader 908 that controls the door 912) to a protected resource 904 and then holds the door 912 open for one or more tailgaters 920. In FIGS. 9A-9B, a door 912 must be pulled open to enter the protected resource 904, while in FIGS. 10A-10B, a door 1012 must be pulled open to exit the protected resource 1004. If a user 916 pulls open the door 912 or 1012 and then allows one or more tailgaters 920 to pass through the access point before the user 916 himself or herself passes through, then the access control system may need to retroactively apply an ingress/egress determination for the user 916 to the tailgater 920 once the user 916 has completed an ingress or egress event. The system can determine whether to apply the same determination to the tailgater 920 as to the user 916 based on whether the distance between the primary user and the tailgater remains relatively constant immediately before and immediately after the ingress/egress event (indicating, e.g., that the tailgater 920 was following the primary user 916 to the access point, and that the primary user 916 followed the tailgater 920 through the access point after holding the door 912 or 1012 open for the tailgater 920), or decreases immediately before the ingress/egress event and increases immediately thereafter (indicating, e.g., that the tailgater 920 and the primary user 916 approached the access point (and each other) from opposite sides of the access point, then walked away from the access point (and each other) after the primary user 916 held open the door 912 or 1012 for the tailgater 920).

Figure 10B:
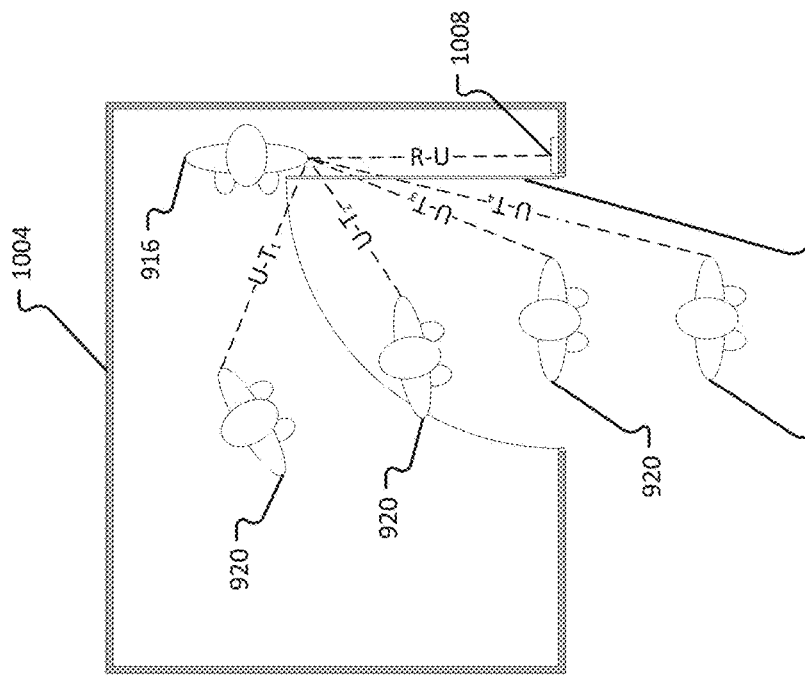
FIG. 10B also depicts a tailgater exiting a protected resource while a user holds open a door of the protected resource in accordance with embodiments of the present disclosure.

If information about the U-T distance in the period before and after the actual ingress/egress event is not available, then an ingress/egress determination can still be made for a tailgater 920. For example, when a user 916 holds a door 912 or 1012 open for a tailgater 920, the U-T distance while the tailgater 920 is holding open the door 912 or 1012 will decrease and then increase regardless of whether the tailgater is entering or exiting the protected resource 904 or 1004. FIG. 9B, for example, shows four distances $U-T_1$, $U-T_2$, $U-T_3$, $U-T_4$ that may be measured as a tailgater 920 walks through an access point into protected resource 904 as a user 916 holds open door 912. The very same distances are shown in FIG. 10B as the tailgater 920 walks through an access point and out of protected resource 1004 as a user 916 holds open door 1012. Simply tracking the U-T distance, then, may be insufficient to make an ingress/egress determination for a tailgater 920.

One way to improve the accuracy of tailgater ingress/egress determinations is to include information about the distance between the access control reader 908/1008 and the mobile device(s) of the user 916 (the R-U distance) and the distance between the access control reader 908/1008 and the mobile device(s) of the tailgater 920 (the R-T distance). When combined with information about the U-T distance, as well as with information about which of a pulling action and a pushing action is associated with ingress and which is associated with egress, ingress/egress determinations may be made more accurately, as explained below.

Referring again to FIGS. 9A and 9B, a protected resource 904 has a door 912 that must be pulled open to enter the protected resource 904. A reader 908 controls a locking mechanism of door 912. If a user 916 pulls open door 912 and holds door 912 open while a tailgater 920 passes through the access point, then the R-U distance will stay the same as the door 912 is held open. The R-T distance will change over time, first decreasing (as the tailgater 920 approaches the door 912) and then increasing (after the tailgater 920 passes through the access point, as the tailgater 920 walks away from the door 912). The U-T distance will also change over time, first decreasing (as the tailgater 920 approaches the user 916), and then increasing (after the tailgater 920 passes the user 916, as the tailgater 920 walks away from the user 916). Because the door 912 must be pulled open to enter the protected resource 904, the tailgater 920 will necessarily pass by the user 916 before passing by the reader 908 if entering the protected resource 904, and likewise will necessarily pass by the reader 908 before passing by the user 916 if exiting the protected resource 904. Thus, the U-T distance will reach a minimum before the R-T distance reaches a minimum if the tailgater 920 is entering the protected resource 904, and the R-T distance will reach a minimum before the U-T distance reaches a minimum if the tailgater 920 is exiting the protected resource 904. The access control system can therefore make an ingress/egress determination for the tailgater 920 based on the order in which the minimum R-T and U-T distances occur.

Figure 10A:
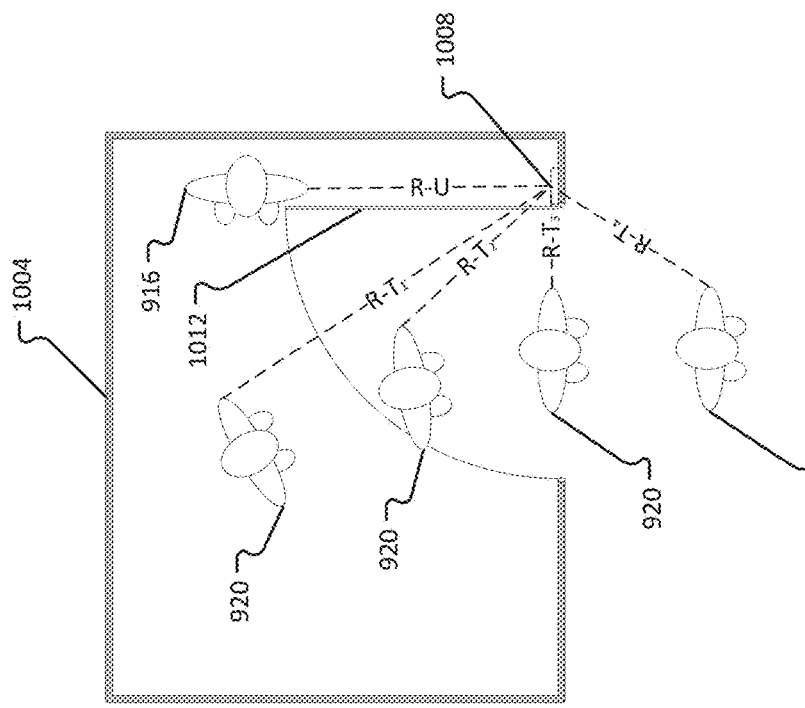
FIG. 10A depicts a tailgater exiting a protected resource while a user holds open a door of the protected resource in accordance with embodiments of the present disclosure.

FIGS. 10A-10B depict a similar scenario to FIGS. 9A-9B, except that the door 1012 to protected resource 1004 must be pulled open to exit the protected resource 1004. Thus, as with the scenario depicted in FIGS. 9A-9B, an ingress/egress determination for the tailgater 920 can be made based on the order in which the minimum R-T and U-T distances occur.

Figure 11B:
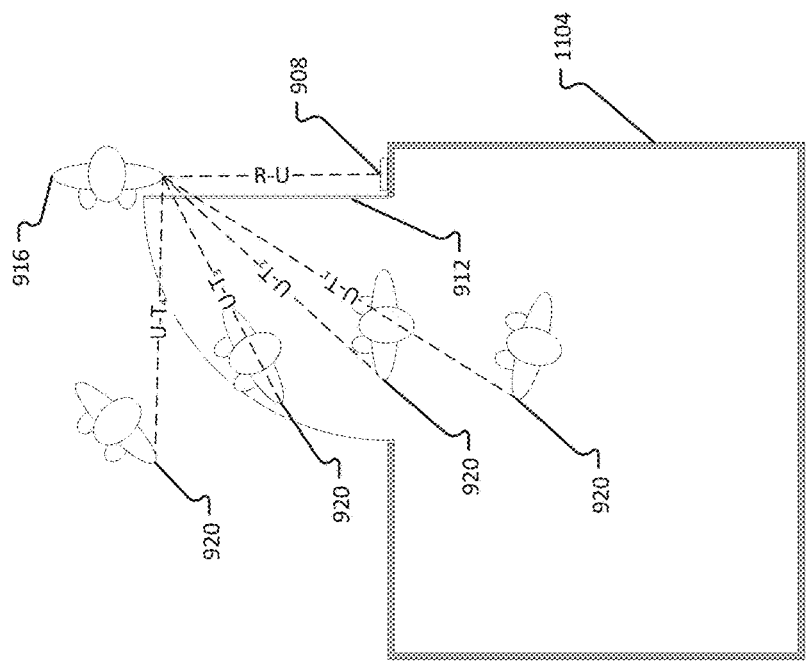
FIG. 11B also depicts a tailgater exiting a protected resource while a user holds open a door of the protected resource in accordance with other embodiments of the present disclosure.
Figure 11A:
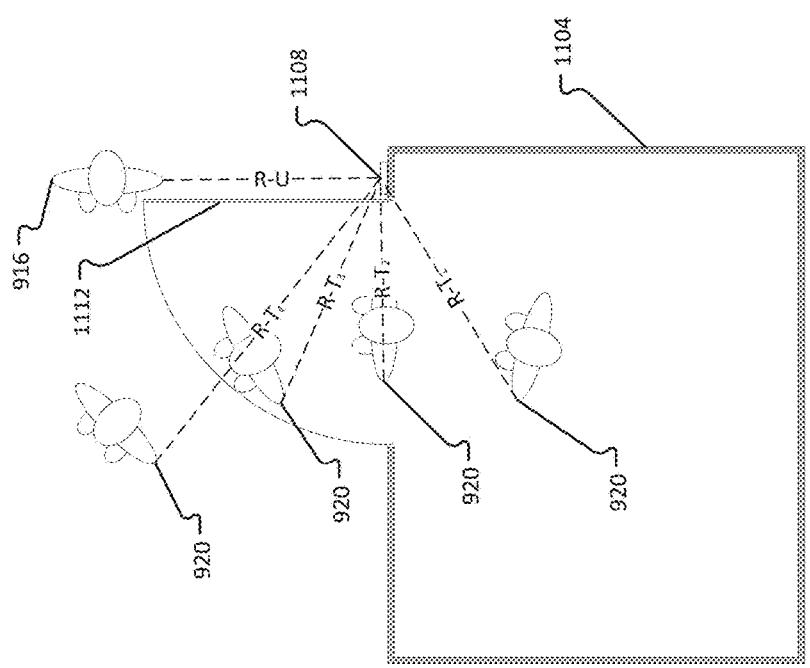
FIG. 11A depicts a tailgater exiting a protected resource while a user holds open a door of the protected resource in accordance with other embodiments of the present disclosure.

FIGS. 11A-11B depict a protected resource 1104 having a door 1112, controlled by a reader 1108, that must be pushed open to exit the protected resource 1104. If a user 916 opens the door 1112 then holds it open for a tailgater 920, then the R-U distance will remain the same (or approximately the same) as tailgater 920 walks through the door. The R-T distance will decrease from $R-T_1$ until the tailgater 920 passes the reader 1108, at which point the distance will be $R-T_2$. The R-T distance will then increase ($R-T_3$, $R-T_4$) as the tailgater 920 walks away from the protected resource 1104. The U-T distance will decrease until it reaches a minimum (in FIG. 11B, distance $U-T_3$) as the tailgater 920 passes the user 916, and will then increase as the tailgater 920 continues to walk away. As with the embodiments of FIGS. 9A-9B and 10A-10B, the ingress/egress determination for the tailgater 920 can be made based on the order in which the minimum R-T and U-T distances occur. Thus, in FIGS. 11A-11B, the minimum R-T distance ($R-T_2$) occurs before the minimum U-T distance ($U-T_3$), indicating that the tailgater 920 is exiting the protected resource 1104.

Turning now to FIGS. 12A-12B, in one scenario, a user 916 may push open a door 1212 (after presenting valid credentials to reader 1208, such that reader 1208 unlocks door 1212) to enter into a protected resource 1204, and then hold the door 1212 open (standing inside the protected resource 1204) for one or more tailgaters 920. The ingress/egress determination for the user 916 may be made in any of the ways described above. As the tailgater 920 passes through the access point, the R-T distance (shown in FIG. 12A) will reach a minimum (the R-T distance minimum) at a given point in time (presumably as the tailgater 920 passes through the access point—distance $R-T_2$ in FIG. 12A), and the U-T distance will also reach a minimum (the U-T distance minimum) at a given point in time (presumably as the tailgater 920 passes by the user 916—distance $U-T_3$ in FIG. 12B). If the R-T distance minimum occurs before the U-T distance minimum, as in FIGS. 12A-12B—suggesting that the tailgater 920 first passed through the access point and by the reader 1208 and then passed by the user 916—then the access control system may conclude that the tailgater 920 has entered the protected resource 1204. On the other hand, if the R-T distance minimum occurs after the U-T distance minimum—suggesting that the tailgater 920 first passed by the user 916 (who is standing inside of the protected resource 1204) and then passed through the access point—then the access control system may conclude that the tailgater 920 has exited the protected resource 1204.

It will be understood that if a door must be pulled open to enter a protected resource, then the opposite conclusions would apply: a tailgater entering the protected resource would result in a U-T distance minimum occurring before the R-T distance minimum, and a tailgater exiting the protected resource would result in a U-T distance minimum occurring after the R-T distance minimum.

The foregoing ingress/egress determination method is particularly useful when a user holding open a door is positioned on the same side of the access point as the reader. When that is the case, the access point door (or gate) prevents the tailgater from passing through the point directly between the user and the reader (which, in turn, could result in the user/reader distance minima occurring at the same time, rendering the foregoing ingress/egress determination method ineffective).

Figure 13A:
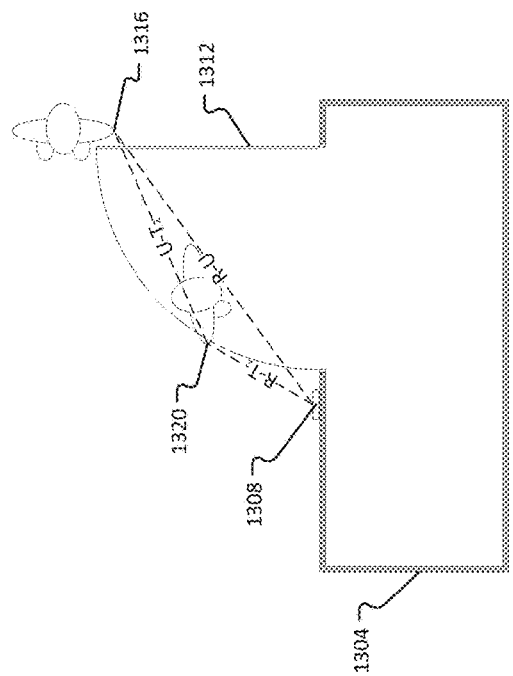
FIG. 13A depicts a tailgater approaching a protected resource from a distance while a user holds open a door to the protected resource.
Figure 13B:
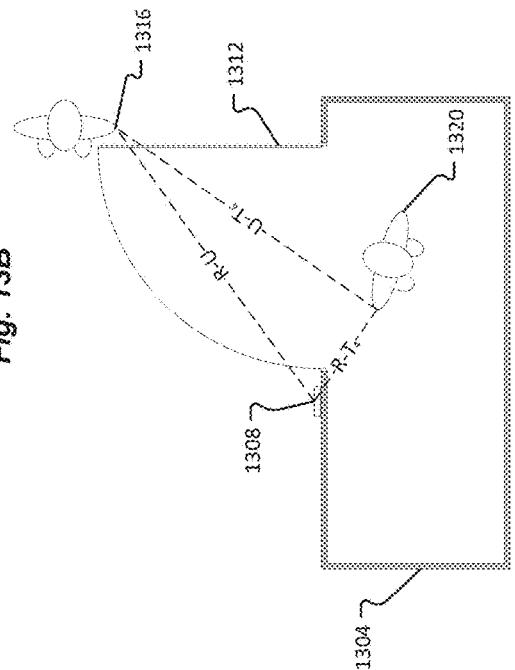
FIG. 13B depicts the tailgater of FIG. 13A approaching the open doorway of the protected resource of FIG. 13A.
Figure 13C:
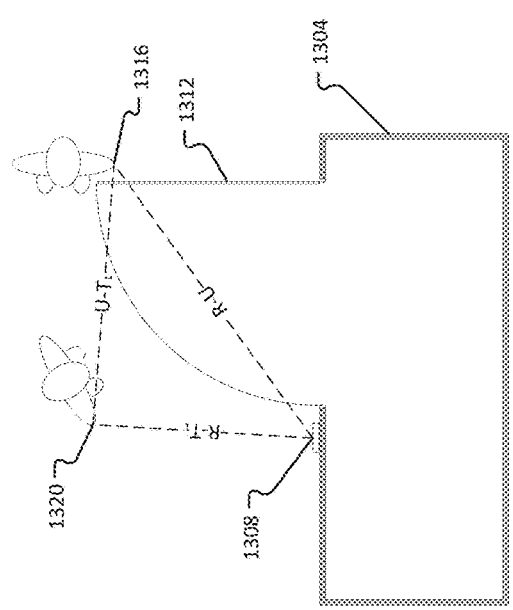
FIG. 13C depicts the tailgater of FIGS. 13A-13B nearing the open doorway of the protected resource of FIGS. 13A-13B.

With reference now to FIGS. 13A-13D, when a user 1316 holding open a door 1312 is positioned on the opposite side of the access point as the reader 1308, an ingress/egress determination can be made using a different method, as follows. As in the above scenarios, an ingress/egress determination for the user 1316 who originally opens the access point door 1312 may be made in one or more of the ways described above. If the user 1316 has pulled the door 1312 open to enter the protected resource 1304 and then holds the door 1312 open for one or more tailgaters 1320, then the user 1316 will be standing outside of the protected resource 1304. The difference between the R-U distance (which does not change as the tailgater 1320 walks through the door 1312), on the one hand, and the sum of the U-T distance and the R-T distance, on the other hand, will be the lowest when the tailgater 1320 crosses the geometric line between the user 1316 and the reader 1308 (as shown in FIG. 13C). For convenience, the R-T distance at that point is referred to hereafter as the line distance.

Figure 13D:
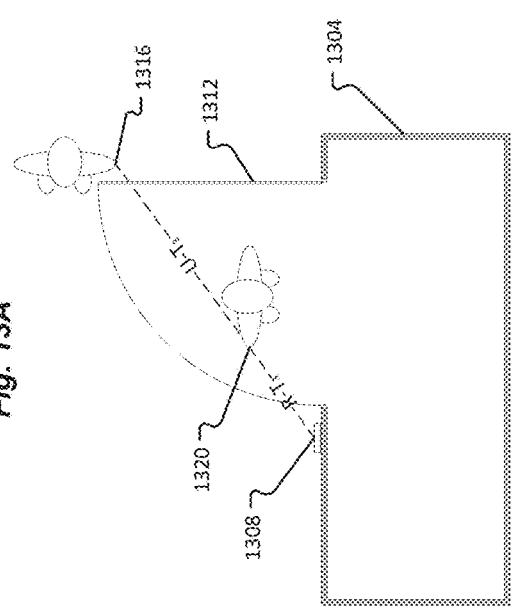
FIG. 13D depicts the tailgater of FIGS. 13A-13C after passing through the open doorway of the protected resource of FIGS. 13A-13C.

The mobile device of the tailgater 1320 will be at the line distance twice: once as the tailgater 1320 approaches the reader 1308 on one side of the access point (in FIG. 13C, distance R-T$_3$), and once as the tailgater 1320 walks away from the reader 1308 on the other side of the access point (in FIG. 13D, distance R-T$_4$). However, the U-T distance when the tailgater 1320 is at the line distance on one side of the access point will be different than the U-T distance when the tailgater 1320 is at the line distance on the other side of the access point. More specifically, when the tailgater 1320 is on the same side of the access point as the user 1316, the U-T distance at the point in time when the R-T distance equals the line distance (in FIG. 13C, distance U-T$_3$) will be lower than the U-T distance corresponding to the line distance when the tailgater 1320 is on the opposite side of the access point as the user 1316 (in FIG. 13D, distance U-T$_4$). Thus, by comparing the U-T distance as determined at each point in time that the mobile device of the tailgater 1320 is at the line distance, the direction of travel of the tailgater 1320 can be determined. If the U-T distance is greater the first time the tailgater 1320 is at the line distance than the second time, then the access control system can determine that the tailgater 1320 has entered the protected resource 1304, and vice versa. Alternatively, if the access point door 1312 must be pulled open to gain entry to the protected resource 1304, and the U-T distance is greater the first time the tailgater 1320 is at the line distance than the second time, then the access control system can determine that the tailgater 1320 has left the protected resource 1304, and vice versa.

An access control system may be configured to make ingress/egress determinations for tailgaters using one or more of the methods described above. It will be understood that in the foregoing description and throughout this disclosure, any reference to a distance between a tailgater and another user or a second device, and/or between a user and a second device, is a reference a distance between a mobile device of the tailgater and a device of the user (e.g. a mobile device, a wearable device, etc.) or the second device (e.g. a reader), and/or between a mobile device of a user and the second device (e.g. a reader, a mobile device, a wearable device, etc.), respectively.

As evident from the present disclosure, an access control system may make an ingress/egress determination even when an individual passing through the access control system does not present credentials to the access control system. For example, some access control systems require the presentation of credentials by a user seeking entrance to a protected resource, but do not require the presentation of credentials by a user exiting the protected resource. In these and other scenarios, an access control system reader may still communicate with one or more mobile devices of each passerby to make an ingress/egress determination.

In some embodiments, one or more of a user's mobile devices may gather information needed to make an ingress/egress determination continuously or when certain parameters are met (e.g. when the mobile device is within a particular geographical area, or when the mobile device senses that the user is moving as opposing to sitting or standing). Then, if and when the mobile device passes within communication range of an access control reader, the mobile device may transmit the information needed to make an ingress/egress determination, or an ingress/egress determination itself, to the access control reader. The communication may occur using any communication protocol known in the art, including Bluetooth, BLE, NFC, WiFi, ZigBee, infrared, sound, light, etc. The mobile device may transmit the information immediately after the information has been gathered, or the mobile device may transmit the information at some later point in time. The latter alternative is particularly useful when the mobile device and the reader communicate via NFC, because the mobile device may not have sufficient information to make an ingress/egress determination until after it is beyond communication range of the reader.

Figure 14:
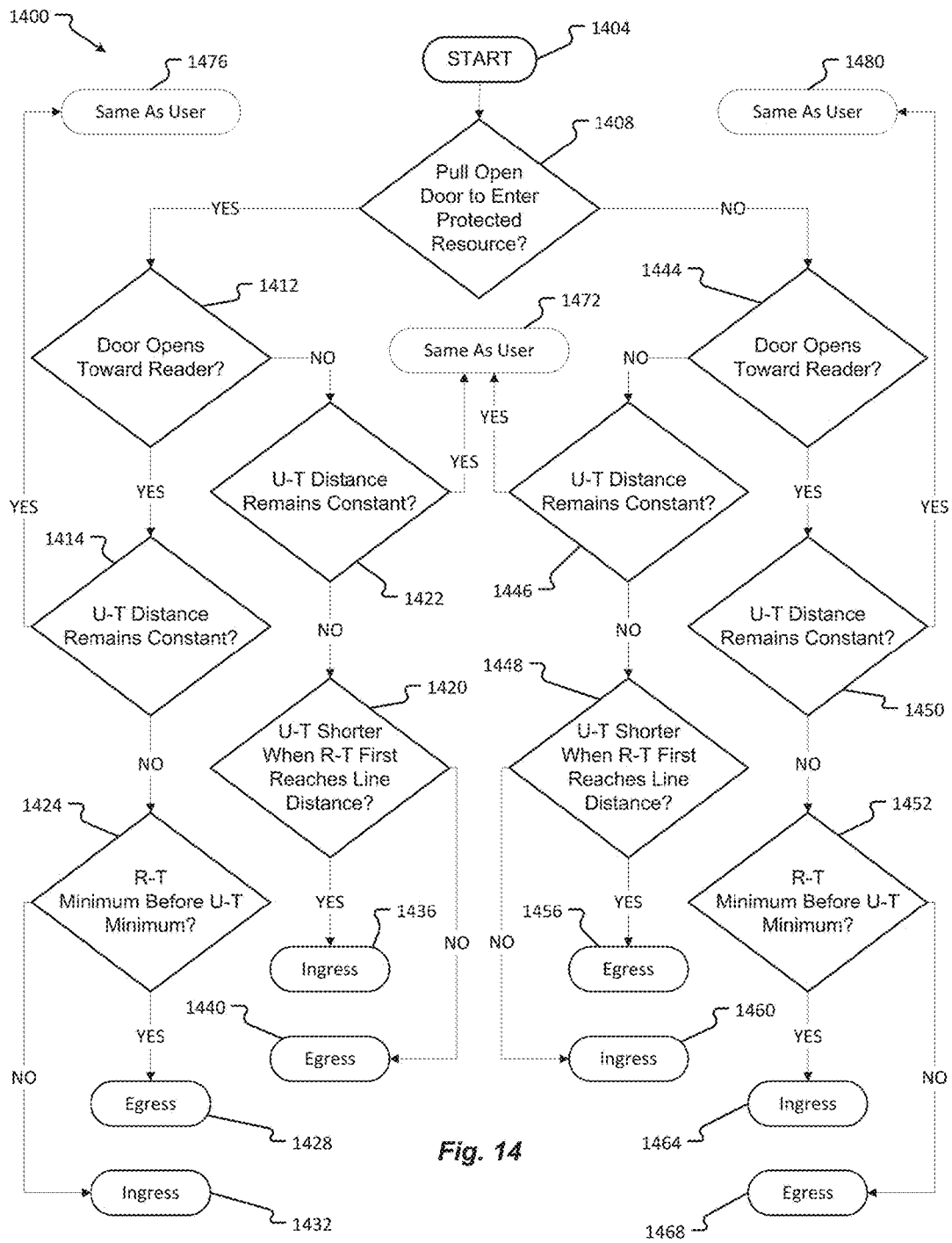
FIG. 14 is a flowchart depicting a method of making an ingress or egress determination according to embodiments of the present disclosure.

FIG. 14 provides a flowchart for a process 1400 for use by an access control system in making an ingress/egress determination for a tailgater. The process 1400 begins at 1404, and first determines whether the door must be pulled open to enter the protected resource (step 1408). The access control system then determines whether the door of the protected resource opens toward the reader (steps 1412, 1444). These steps may occur during a calibration or initialization procedure for the access control system, during which an administrator may configure one or more settings of the access control system to indicate whether the door of the protected resource must be pulled open or pushed open to enter the protected resource, and whether the door of the protected resource opens toward the reader. In such embodiments (e.g. when a one-time calibration or initialization addresses steps 1408 and 1412), the process of making an ingress/egress determination for a tailgater may begin at one of steps 1424, 1420, 1448, and 1444, depending on whether the door must be pulled open to enter the protected resource and whether the door opens toward the reader.

If the door must be pulled open to enter the protected resource, and if the door opens toward the reader, then the access control system first determines whether the U-T distance remains approximately constant (step 1414). If so, then the access control system applies the same determination to the tailgater as it applies to the user (step 1476). If not, then the access control system determines whether the R-T distance reaches a minimum before the U-T distance reaches a minimum (step 1424). If so, then the system determines that the tailgater left the protected resource (step 1428). If the R-T distance reaches a minimum after the U-T distance reaches a minimum, then the system determines that the tailgater has entered the protected resource (step 1432).

If the door must be pulled open to enter the protected resource, but if the door opens away from the reader, then the access control system first determines whether the U-T distance remains approximately constant (step 1422). If so, then the access control system applies the same determination to the tailgater as it applies to the user (step 1472). If not, then the access control system determines whether the U-T distance is shorter when the R-T distance first reaches the line distance as compared to when the R-T distance next reaches the line distance (step 1420). If so, then the system makes an ingress determination (step 1436). If, on the other hand, the U-T distance is shorter when the R-T distance reaches the line distance for the second time, then the system makes an egress determination (step 1440).

If the door must be pushed open to enter the protected resource, and if the door opens toward the reader, then the access control system first determines whether the U-T distance remains approximately constant (step 1450). If so, then the access control system applies the same determination to the tailgater as it applies to the user (step 1480). If not, then the access control system determines whether the R-T distance reaches a minimum before the U-T distance reaches a minimum (step 1452). If so, then the system determines that the tailgater has entered the protected resource (step 1464). If the R-T distance reaches a minimum after the U-T distance reaches a minimum, then the system determines that the tailgater has left the protected resource (step 1468).

If the door must be pushed open to enter the protected resource, but if the door opens away from the reader, then the access control system first determines whether the U-T distance remains approximately constant (step 1446). If so, then the access control system applies the same determination to the tailgater as it applies to the user (step 1472). If not, then the access control system determines whether the U-T distance is shorter when the R-T distance first reaches the line distance (1448) (e.g. as compared to when the R-T distance next reaches the line distance). If so, then the system makes an egress determination (step 1456). If, on the other hand, the U-T distance is shorter when the R-T distance reaches the line distance for the second time, then the system makes an ingress determination (step 1460).

The illustrative systems and methods of this disclosure have been described in relation to wearable devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a wearable device, a mobile device, a reading device, a communication device, and/or an access server of an access control system, etc.

Furthermore, while the illustrative aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In other embodiments, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is claimed is:

1. A method, for use in an access control reader controlling access to a protected physical asset, for making an ingress or egress determination with an access control system, the method comprising:
   identifying, with a processor and based on information received via a wireless interface of an access control reader, a plurality of mobile devices within communication range of the access control reader;
   receiving first information from at least one of the plurality of mobile devices, the first information corresponding to a first distance between at least two of the plurality of mobile devices;
   receiving second information from at least one of the plurality of mobile devices, the second information corresponding to a second distance between at least two of the plurality of mobile devices; and
   making an ingress or egress determination for a user of at least one of the plurality of mobile devices with respect to the protected physical asset based on the first information and the second information.

2. The method of claim 1, further comprising:
   storing the ingress or egress determination in a memory of the access control reader;
   generating an access point profile based on a plurality of stored ingress or egress determinations from the memory of the access control reader; and
   transmitting the access point profile from the access control reader.

3. The method of claim 1, wherein making the ingress or egress determination comprises comparing the first distance with the second distance.

4. The method of claim 1, wherein making the ingress or egress determination comprises calculating a change in distance over time based on the first distance and the second distance and comparing the change in distance over time to third information stored in a memory of the access control reader.

5. The method of claim 1, wherein the first information comprises RSSI information or time-of-flight information.

6. The method of claim 1, wherein making the ingress or egress determination is further based on information corresponding to muscle expansion or contraction.

7. An access control reader controlling access to a protected physical asset, comprising:
  a processor;
  a wireless communication interface; and
  a memory storing instructions that, when executed by the processor, cause the processor to:
    identify, with the processor and based on information received via the wireless communication interface, a plurality of mobile devices within communication range of the wireless communication interface;
    receive first information from at least one of the plurality of mobile devices, the first information corresponding to a first distance between at least two of the plurality of mobile devices;
    receive second information from at least one of the plurality of mobile devices, the second information corresponding to a second distance between at least two of the plurality of mobile devices; and
    make an ingress or egress determination for a user of at least one of the plurality of mobile devices with respect to the protected physical asset based on the first information and the second information.

8. The access control reader of claim 7, wherein making the ingress or egress determination comprises evaluating, based on the first information and the second information, a variation over time of a distance between two of the plurality of mobile devices.

9. The access control reader of claim 7, wherein at least one of the first information and the second information comprises RSSI or time-of-flight information.

10. The access control reader of claim 9, wherein the memory stores additional instructions that, when executed by the processor, cause the processor to:
  calculate at least one of the first distance and the second distance using the RSSI or time-of-flight information.

11. The access control reader of claim 7, wherein making the ingress or egress determination is further based on information about muscle expansion or contraction.

12. The access control reader of claim 7, wherein at least one of the first information and the second information further comprises acceleration information.

13. The access control reader of claim 7, wherein making the ingress or egress determination comprises comparing the first information or the second information with other information stored in the memory.

14. The access control reader of claim 13, wherein the other information stored in the memory comprises information about a relative distance between at least two of the plurality of mobile devices during an ingress event.

15. The access control reader of claim 7, further comprising a wired or wireless transmitter, and wherein the memory stores additional instructions that, when executed by the processor, further cause the processor to:
  store the ingress or egress determination in the memory; and
  send the ingress or egress determination to a predetermined computing device via the transmitter.

16. The access control reader of claim 7, wherein making the ingress or egress determination comprises comparing the first distance with the second distance.

17. The access control reader of claim 7, wherein the reader further comprises a lock control mechanism, and the memory stores additional instructions that, when executed by the processor, further cause the processor to:
  operate the lock control mechanism based on the ingress or egress determination.

18. A system for controlling access to a protected physical asset, comprising:
  a first mobile device;
  a second mobile device; and
  an access control reader, the access control reader comprising:
    a processor;
    a wireless communication interface;
    a memory storing instructions that, when executed by the processor, cause the processor to:
      verify, with the processor and based on information received via the wireless communication interface, that the first mobile device and the second mobile device are within communication range of the wireless communication interface;
      receive first information from at least one of the first mobile device and the second mobile device, the first information corresponding to a first distance between the first mobile device and the second mobile device;
      receive second information from at least one of the first mobile device and the second mobile device, the second information corresponding to a second distance between the first mobile device and the second mobile device; and
      make an ingress or egress determination for a user of at least one of the first mobile device and the second mobile device based on the first information and the second information.

19. The mobile device of claim 18, wherein at least one of the first information and the second information comprises RSSI information or time-of-flight information.

20. The mobile device of claim 18, wherein the first information is received from the first mobile device, and the first information comprises sensor information from a sensor of the first mobile device.

* * * * *